Oct. 27, 1959 L. R. F. HARRIS 2,910,542

TIME DIVISION MULTIPLEX COMMUNICATION SYSTEMS

Filed Nov. 24, 1954 11 Sheets-Sheet 1

INVENTOR
Lionel R. F. Harris
BY Hall & Houghton
ATTORNEY

TIME DIVISION MULTIPLEX COMMUNICATION SYSTEMS

Filed Nov. 24, 1954

INVENTOR
Lionel R. F. Harris
BY Hall & Houghton
ATTORNEY

INVENTOR
Lionel R. F. Harris
BY Hall • Houghton
ATTORNEY

Oct. 27, 1959 L. R. F. HARRIS 2,910,542

TIME DIVISION MULTIPLEX COMMUNICATION SYSTEMS

Filed Nov. 24, 1954 11 Sheets-Sheet 4

INVENTOR
Lionel R.F. Harris
BY Hall & Houghton
ATTORNEY

Oct. 27, 1959 L. R. F. HARRIS 2,910,542

TIME DIVISION MULTIPLEX COMMUNICATION SYSTEMS

Filed Nov. 24, 1954 11 Sheets-Sheet 5

INVENTOR
Lionel R. F. Harris
BY Hall & Houghton
ATTORNEY

TIME DIVISION MULTIPLEX COMMUNICATION SYSTEMS

Filed Nov. 24, 1954 11 Sheets-Sheet 6

INVENTOR
Lionel R.F. Harris
BY Hall & Houghton
ATTORNEY

Oct. 27, 1959 L. R. F. HARRIS 2,910,542

TIME DIVISION MULTIPLEX COMMUNICATION SYSTEMS

Filed Nov. 24, 1954 11 Sheets-Sheet 7

INVENTOR
Lionel R. F. Harris
BY Hall & Houghton
ATTORNEY

Oct. 27, 1959 L. R. F. HARRIS 2,910,542

TIME DIVISION MULTIPLEX COMMUNICATION SYSTEMS

Filed Nov. 24, 1954 11 Sheets-Sheet 8

INVENTOR

Lionel R. F. Harris

BY Hall & Houghton

ATTORNEY

INVENTOR
Lionel R.F. Harris
BY Haller Knighton
ATTORNEY

INVENTOR
Lionel R.F. Harris
BY Hall + Houghton
ATTORNEY

INVENTOR
LIONEL R. F. HARRIS
BY Hall + Houghton
ATTORNEY

United States Patent Office 2,910,542 Patented Oct. 27, 1959

2,910,542

TIME DIVISION MULTIPLEX COMMUNICATION SYSTEMS

Lionel Roy Frank Harris, Kenton, England, assignor to Her Majesty's Postmaster General, London, England Application November 24, 1954, Serial No. 471,072

17 Claims. (Cl. 179—15)

This invention relates to communication systems in which time division multiplex is used, and has particular although not exclusive reference to automatic telephone exchange systems employing time division multiplex for the purposes of selecting circuits, switching the connections between circuits and transmitting speech.

In this specification an electric pulse is defined as a sudden change of current or voltage lasting for a brief period. A succession of pulses equally spaced in time constitutes a pulse train. A group of pulse trains are said to be equally timed spaced if the pulse repetition rate is the same in all trains of the group and if all the pulses of all the trains in the group occur at equal time intervals. Two pulse trains are said to be coincident if the pulses of one train coincide with the pulses of the other train. Combinations of a plurality of pulse trains all appearing on one lead such that the time intervals between consecutive pulses appearing on the lead are not equal are not included within the definition of a pulse train but are referred to herein as a combination of pulse trains.

One object of the present invention is to provide a more efficient system for selecting one of a number of circuits calling for connection to an exchange. Thus, according to one feature of the present invention the selection of a calling circuit is achieved in a number of stages by selecting means whose total number is equal to the number of stages.

For example, the circuits may be divided into groups, selecting means being provided for selecting a group having one or more calling circuits and further selecting means being provided for selecting from that group the one or one of the calling circuits. If the number of circuits is extremely large the time taken to make a selection becomes excessive and can be reduced by further dividing the groups into sub-groups so that three selecting stages are required. In that case, first selecting means are provided for selecting a group, second selecting means are used to select a sub-group within the selected group and third selecting means select a calling circuit within the selected sub-group in the selected group.

In the case of a two stage selecting system the circuits are arranged in a number of groups each of which has an individual indicating lead. Each such lead is associated with means for generating a time-spaced pulse train for each circuit in the group. A further indicating lead common to all the groups is associated with further means for generating a time-spaced pulse train for each group. The time-spaced pulse trains generated by each of the first mentioned means are synchronous and may also be synchronous with the pulse trains generated by the further means. Thus, each circuit is characterised by the pulse train of the group containing it on the common indicating lead and the pulse train of the particular circuit on the indicating lead individual to the group containing the circuit. First and second selecting means serve the common indicating lead and the individual indicating lead respectively, the second selecting means being common to all the indicating leads individual to each group.

Each selecting means preferably includes a plurality of registering devices such that the number of combinations of registering devices taken any number at a time is at least equal to the maximum number of pulse trains which may be generated on the associated indicating lead. Thus, each combination of registering devices characterises a particular pulse train. A pulse train on the indicating lead common to all the groups is first selected and indicated by a particular combination of registering devices, that indication permitting the pulse trains of calling circuits in the selected group to be applied to the selecting means common to all the leads individual to each group so that a selection of one circuit can be made. The selected circuit is indicated by the combination of operated registering devices in the first selecting means together with the combination of operated registering device in the second selecting means.

According to another feature of the present invention in a time division multiplex communication system there is provided means for controlling the setting up of a connection between a selected calling circuit and a called circuit in which the connection is effected by means of a register and the connection between the calling circuit and the register and between the called circuit and the register is by common signal circuits and in which the pulse trains used in the said connections may or may not be synchronous.

Thus, in one embodiment, the selected calling circuit is connected to a register into which designation information is transmitted. When the register has received sufficient designation information for it to commence setting up the connection it applies to an exchange marker which when free operates to indicate the required circuit or group of circuits. Indicating, selecting and setting up apparatus then operate to set up a connection between the register and a selected marked called circuit. If the pulse train used in the calling-circuit-to-register connection is not free either in the called circuits group or in the called side of the register then another pulse train is selected for use in the called-circuit-to-register connection and the setting up of the connection may continue using the two pulse trains. Alternatively, if the pulse train selected for the called-circuit-to-register connection is found to be free on the calling side of the register it may be substituted for the calling-circuit-to-register connection and the setting up proceeds using only one pulse train. In this way the avilable pulse trains are used to the best advantage.

Another feature of the present invention is the provision of a system for bridging the connection between the calling circuit and the called circuit when the register has completed the setting up arrangements. Pulse suppression gates are inserted in the common signal circuits and the gates are closed by pulse trains synchronous with the pulse trains used for the calling-circuit-to-register and called-circuit-to-register connections, so that the register can send and receive information over either or both of the circuits without interference. The connection between the calling circuit and the called circuit is not completed until the register is released, the pulse train used for that connection being synchronous with at least one of the pulse trains used for the calling-circuit-to-register and called-circuit-to-register connections.

As an example a time division multiplex communication system embodying the various features of the present invention will now be described in greater detail with reference to the accompanying drawings of which:

Figure 9:
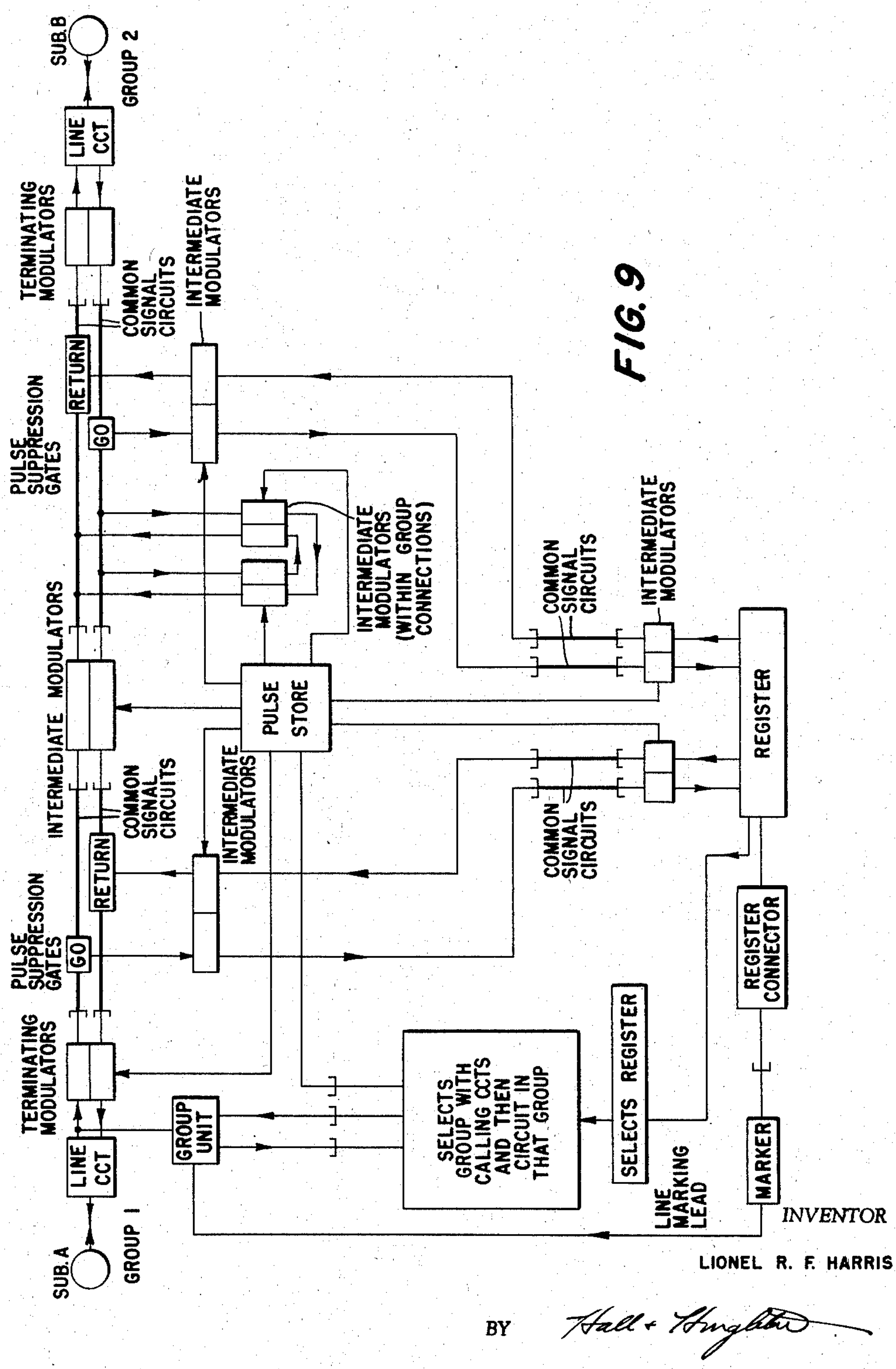
Figure 9 shows in block schematic form the essential components of the embodiment.

Referring first to Figure 9 which shows in simplified block schematic form the essential components of the system, there is shown a subscriber SUB A who is one of a group, group 1, of subscribers and second subscriber SUB B of a different group, group 2, of subscribers.

Subscriber SUB A is connected via his line circuit to terminating modulators which, when pulsed from the pulse store, connect the subscriber in the well known manner of time division multiplex systems to common signal circuits comprising "Go" and "Return" paths individual to the subscribers forming group 1. Connected in the common signal circuits are pulse suppression gate circuits by means of which communication can be established from a subscriber in group 1 to a register. Such communication is established via intermediate modulators at each end of further common signal circuits, these intermediate modulators being pulsed in a manner described later in more detail to effect such communication.

The common signal circuits of group 1 are also connected by further intermediate modulators to the common signal circuits of group 2. The subscribers of group 2 are connected to the common signal circuits of their group in a manner identical with that just described with reference to group 1. The common signal circuits of group 2 are also connected in like manner to those of group 1 to the register.

Although only one register is shown in Figure 9, there will normally be a number of these devices all capable of being connected via a register connector to a marker whose function is to mark each of one or more suitable circuits. The registers are also connected to a register selector which operates to select and mark a free register of the set of registers.

Provided for each group is a group unit which generates for each subscriber in the group either calling for connection or connected a characteristic pulse train and also an identifying signal in the group when the latter includes calling subscribers. The output of the group unit is applied to selector equipment which selects firstly a group containing one or more calling subscribers and then one of the calling subscribers to which connection can be made to a register marked by the register selector as free.

Whilst the pulse suppression gates referred to above permit connection initially from a calling subscriber to a free register, the gates also prevent connection of the calling subscriber to a called subscriber until an appropriate moment. It will be appreciated that at some stage in the setting up of the connection information is being sent between the calling subscriber and the register and between the called subscriber and the register and it is therefore desirable to prevent transmission between the calling and called subscribers. The manner of effecting this is described in detail below.

Although in Figure 9, two groups of subscribers only are shown it will be understood that there may be more than two groups and that the common signal circuits of each group are interconnected with the common signal circuits of every other group by means of intermediate modulators.

Figure 1:
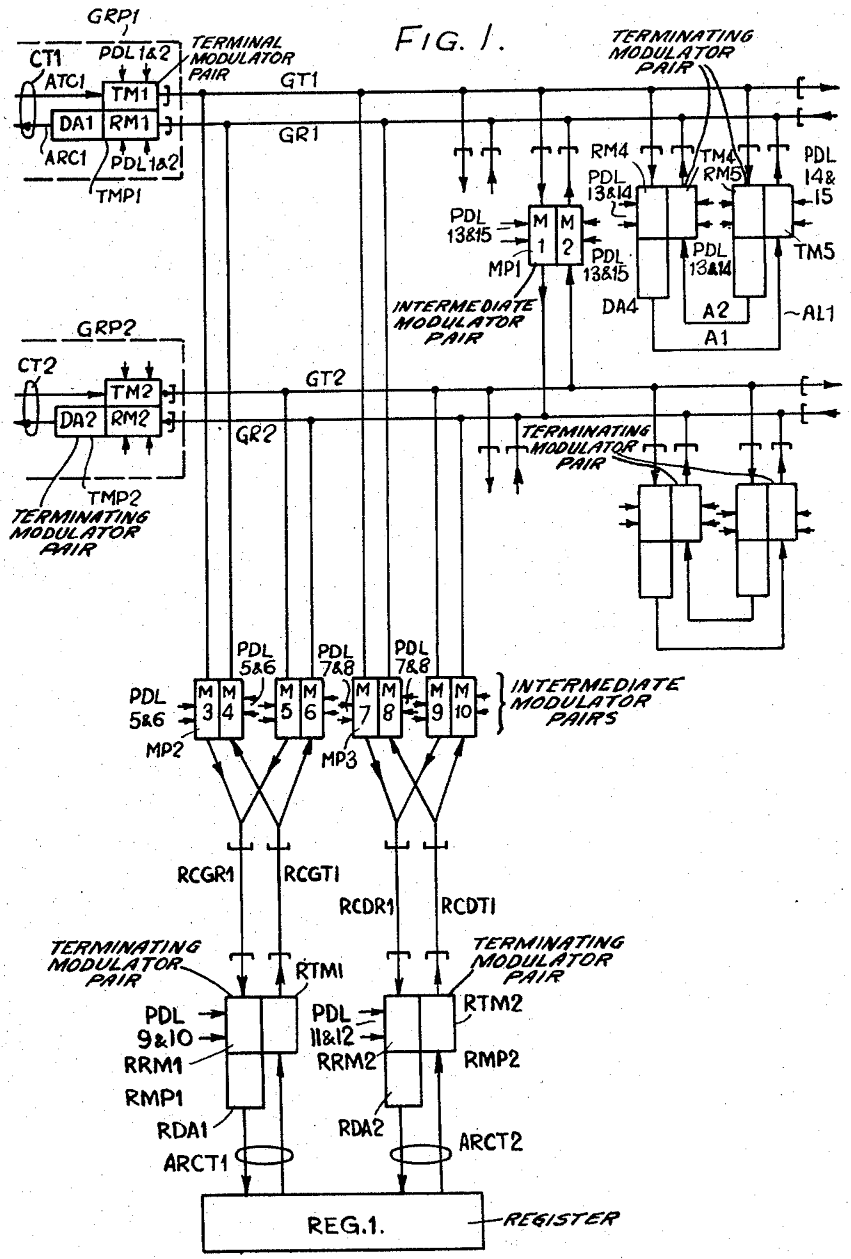
Figure 1 is a block schematic showing connections between a register and two groups of circuits.

Circuits which may be subscribers' lines, junctions or other lines external or internal of the exchange are arranged in groups, two of which are shown in Fig. 1 of the drawings and in each group one circuit is shown. Thus circuit CT1 is in group GRP1 and circuit CT2 is in group GRP2. It will be assumed that the circuits are 4-wire at the point where they are connected to the exchange communication system. It is well-known to convert a two wire circuit into a four-wire circuit using a hybrid transformer. The circuits calling for connection or already connected through the exchange are indicated by the presence of a D.C. signal on leads associated with the circuits. This signal may be derived for example by the D.C. change in potential on one lead of a subscriber's pair of leads when a loop is completed on the pair of leads by the subscriber calling for connection.

Each circuit is connected to a terminating modulator pair and all the terminating modulator pairs of a group are connected to a group common lead pair. Thus the transmit channel ATC1 of CT1 is connected to group transmit common lead GT1 via a transmit modulator TM1 when pulsed over pulse distribution leads PDL1 and 2. TM1, RM1 and DA1 comprise the terminating modulator pair TMP1 of circuit CT1. The circuits of GRP2 are similarly connected via terminating modulator pairs to group transmit and receive common leads GT2 and GR2. The demodulator and amplifiers associated with a receive modulator enable the audio signal which modulates the pulses received by the receive modulator to be recovered at substantially the same level as the original modulating signal. A hold signal may also be derived from them which indicates whether or not the receive modulator is receiving pulses.

Each register in the exchange, one of which REG1 is shown in Fig. 1 is connected via two bothway audio circuits to the exchange transmission means. One bothway audio circuit referred to as the register calling circuit is used for connections between calling circuits and the register and the other bothway audio circuit referred to as the register called circuit is used for connections between called circuits and the register. The register calling circuits are connected via register terminating modulator pairs to a calling register calling common lead pair and the register called circuits are connected via register terminating modulator pairs to a register called common lead pair. Thus ARCT1 the register calling circuit of register REG1 is connected via the register terminating modulator pair RMP1 comprising transmit modulator RTM1, receive modulator RRM1 and demodulator and amplifier RDA1 to register calling common lead pair comprising register calling common transmit lead RCGT1 and register calling common receive lead RCGR1 when the register terminating modulator pair RMP1 is pulsed over pulse distribution leads PDL 9 and 10. Similarly the register called circuit ARCT2 of REG1 is connected via a register terminating modulator pair RMP2 comprising transmit modulator RTM2, receive modulator RRM2 and demodulator and amplifier RDA2 to register called common lead pair comprising register called common transmit lead RCDT1 and register called common receive lead RCDR1, when the register terminating modulator pair RMP2 is pulsed over pulse distribution leads PDL11 and 12. Each group common lead pair is connected to the group common lead pair of every other group and to the register calling and the register called common lead pairs via pairs of modulators which when pulsed connect the common lead pairs together. Thus intermediate modulator pair MP1 connects GT1 to GR2 and GT2 to GR1 when pulsed over leads PDL13 and 15. Intermediate modulator pair MP2 connects GT1 to RCGR1 and GR1 to RCGT1 when pulsed over leads PDL5 and 6. Intermediate modulator pair MP3 connects GT1 to RCDR1 and GR1 to RCDT1 when pulsed over leads PDL7 and 8, and similarly other intermediate modulators interconnect other common lead pairs when pulsed.

Each group common lead pair GT and GR is also connected to other terminating modulator pairs which are interconnected in pairs on their low frequency side by audio circuits. One such pair of terminating modulator pairs is shown for each group common lead pair in Fig. 1. Thus GT1 is connected to receive modulator RM4 whose output is applied to demodulator and amplifier DA4 from which a hold signal is also derived when RM4 is receiving pulses, and whose output is also applied over audio circuit A1 to transmit modulator TM5 whose output is connected to GR1. Similarly GT1 is connected to receive modulator RM5 which forms a pair with TM5 and its output is applied via demodulator and amplifier DA5, from which a hold signal is also derived when RM5 is receiving pulses and the audio output of which is connected over audio circuit A2 to transmit modulator TM4, which forms a modulator pair with RM4, and whose output is connected to GR1. Pulses may be applied to RM4 and TM4 over leads PDL13 and 14 and to RM5 and TM5 over leads PDL 14 and 15. If pulses are received in RM4 then the hold signal derived in DA4 applied to TM5 causes the pulses applied on PDL14 and 15 to TM5 to be transmitted to GR1. Similarly if RM5 receives pulses, the hold signal derived in DA5 applied to TM4 causes the pulses applied on PDL13 and 14 to TM4 to be transmitted to GR1. These pulses from TM5 and TM4 on GR1 will be modulated by the audio signals appearing on the audio circuits A1 and A2 respectively.

Connection between a calling circuit and a register is made by causing coincident pulse trains to be made effective in the terminating modulator pair of the calling circuit, in the register calling terminating modulator pair and in the intermediate modulator pair connecting the group common lead pair of the group which includes the calling circuit, to the calling register common lead pair. To set up such a connection so that double connections are avoided, a pulse train which is not in use either in any of the terminating modulator pairs in the calling circuits group or in any of the group of register calling terminating modulator pairs must be selected for the connection.

Connection between a called circuit and a register is made by causing coincident pulse trains to be made effective in the terminating modulator pair of the called circuit, the register called terminating modulator pair and in the intermediate modulator pair connecting the group common lead pair of the called circuit's group to the called register common lead pair. To set up such a connection so that double connections are avoided, a pulse train which is not in use either in any of the terminating modulator pairs in the called circuit's group nor in any of the group of register called terminating modulator pairs must be selected.

Connection between a calling circuit and a called circuit in different groups is made by causing coincident pulse trains to be made effective in the terminating modulator pairs of the calling and called circuits and in the intermediate modulator pairs connecting their group's group common lead pairs. To set up such a connection so that undesired double connections are avoided a pulse train which is not in use in any of the other terminating modulator pairs of either the calling or called circuits group must be selected.

Connection between a calling circuit and a called circuit in the same group is made by causing one set of coincident pulse trains to be made effective in the terminating modulator pair of the calling circuit and in the terminating modulator pair at one end of an audio link and a different set of coincident pulse trains to be made effective in the terminating modulator pair of the called circuit and in the terminating modulator pair at the other end of said audio link. To avoid undesired double connections neither of these pulse trains must be in use in any of the other terminating modulator pairs in the group.

It will be clear to those skilled in the art that the physical length of the common lead pairs may be such that the time delay in the transmission of a pulse from one end to the other may not be negligible in exchanges in which there are many groups of circuits. The delay may be allowed for by applying coincident pulse trains to both modulators in each pair of intermediate modulators and by causing the pulse trains applied to the transmit modulators of the circuits' modulator pairs to be phase advanced such that the time of advance is equal to the delay of the transmission over the common transmit lead. Similarly the pulse trains applied to the receive modulator of the circuits' modulator pairs are caused to be phase retarded such that the time by which the pulse is retarded is equal to the delay of the transmission over the common receive lead. The pulse trains applied to the receive modulators are thus arranged to be a version of those applied to the transmit modulators delayed by twice the delay of the group common leads. This may be achieved for example by using electrical delay lines in the pulse leads connected to the receive modulators.

As already described, after a register has applied to the marker, simultaneous connections exist between the calling circuit and the register, the called circuit and the register and a connection is prepared but not completed between the calling and called circuits. In the exchange system herein disclosed the calling and called circuit connection is prepared by causing the pulse train to be used for that connection to be effective in the appropriate modulators. Pulse suppression gates (not shown in Fig. 1) are provided in the group common leads and the pulses applied to them over inhibiting leads are those of pulse trains in use on connections between the circuits in the group and the registers. It is arranged during the setting up of a connection that the pulse train to be used for the connection between the calling circuit and the called circuit is coincident with either or both if they are the same, of the pulse trains used in connecting the register to the calling and called circuits. So long as the register is in circuit the pulses controlled by the register prevent the transmission through the pulse suppression gates of the pulses that will be employed to connect together the calling and called circuits. These points will be made clearer with reference to Fig. 2.

Figure 2:
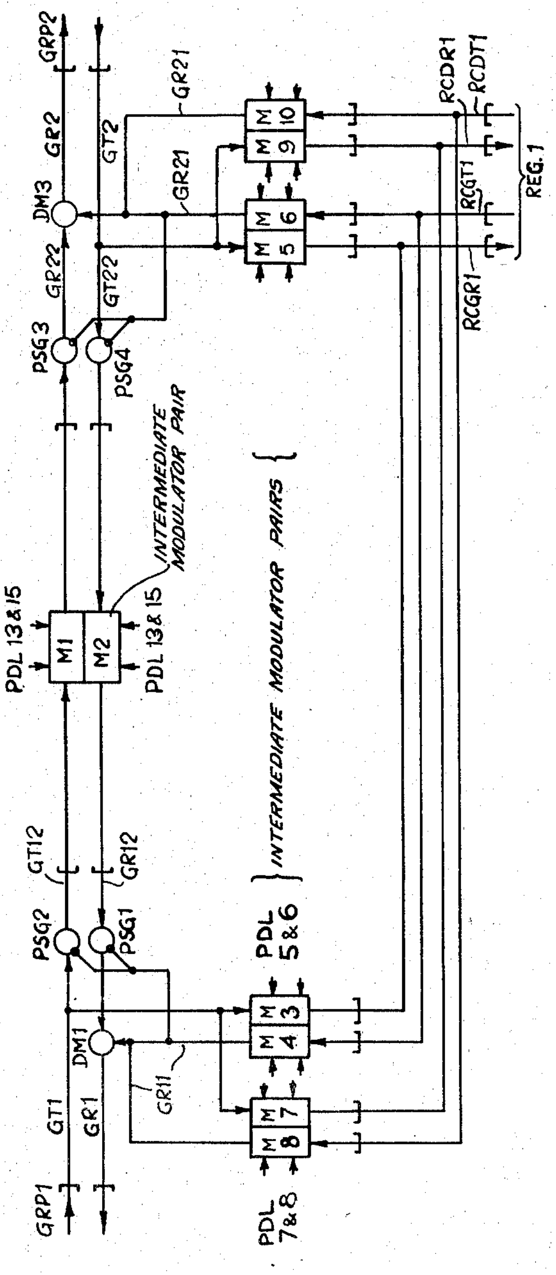
Figure 2 shows part of Figure 1 in more detail.

Fig. 2 shows two groups GRP1 and GRP2 each having a group common lead pair comprising respectively common transmit leads GT1 and GT2 and common receive leads GR1 and GR2, the register calling lead pair RCGT1 and RCGR1 and the register called common lead pair RCDT1 and RCDR1. Lead GT1 is connected via pulse suppression gate PSG2 to intermediate modulators, one of which M1 is shown and which is used to connect GT1 to the common receive lead GR2. Lead GT1 is also connected via modulators M3 and M7 to leads RCGR1 and RCDR1. Lead GT2 is connected via pulse suppression gate PSG4 to intermediate modulators, one of which M2 forming an intermediate pair with M1, is shown in Fig. 2 and is used to connect GT2 to GR1. GT2 is also connected to modulators M5 and M9 used to connect GT2 to RCGR1 and RCDR1. The output of modulator M1 is connected, in common with the outputs of other modulators used in connecting GR2 to the common transmit leads of other groups, to pulse suppression gate PSG3 and thence via decoupling means DM3 to GR2. The output of modulator M2 is connected, in common with the outputs of other modulators used in connecting GR1 to the common transmit leads of other groups, to pulse suppression gate PSG1 and thence via decoupling means DM1 to GR1. RCGT1 is connected via modulators M4 and M6 to leads GR11 and GR21 associated with groups GRP1 and GRP2 respectively. RCDT1 is connected via modulators M8 and M10 to leads GR11 and GR21 associated with groups GRP1 and GRP2, respectively. GR11 is connected via decoupling means DM1 to GR1 and is also connected to the pulse suppression gates PSG1 and PSG2. GR21 is connected via decoupling means DM3 to GR2 and is also connected to pulse suppression gates PSG3 and PSG4. If the calling circuit is in group GRP1 and the called circuit in group GRP2 then provided the pulse train which is used for the connection from the calling circuit to the register which appears on GR11 applied to PSG1 and PSG2 or the pulse train which is used for the connection from the called circuit to the register which appears on GR21 applied to PSG3 and PSG4 is coincident with that used for the calling to called circuit connection, transmission between the two circuits is suppressed in one or other pair of suppression gates.

Figure 3:
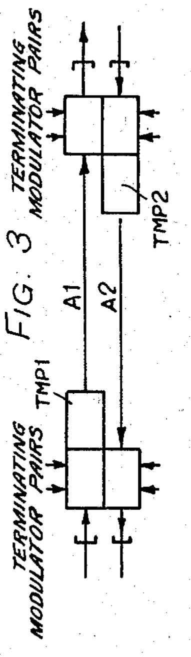
Figure 3 shows an audio link, and Figures 4A, 4B, 5A, 5B, 6A, 6B, 7A and 7B when assembled according to Figure 8 represent a block schematic of part of an exchange using time division multiplex switching.

If the connection is between circuits in the same group then still with reference to Fig. 2, the following pairs of units are identically the same, GT1 and GT2, GR1 and GR2, DM1 and DM3, PSG1 and PSG3, PSG2 and PSG4, GR11 and GR21, M3 and M5, M4 and M6, M7 and M9, M8 and M10 and connection is made via an audio link as shown in Fig. 3 instead of intermediate modulators as M1 and M2 of Fig. 2. Fig. 3 shows two terminating modulator pairs TMP1 and TMP2 connected by two audio circuits A1 and A2. The connection between calling and called circuits is made using one pulse train effective in the terminating modulator pair of the calling circuit and in TMP1 and another pulse train effective in the terminating modulator pair of the called circuit and TMP2. If the pulse trains used for either connection to the register, which will appear in Fig. 2 on leads GR11 and GR21 connected to the suppression gates, coincide with either of the pulse trains used for the calling to called circuit connection, transmission between the two circuits is suppressed until the register releases and removes the suppression pulses from GR11 and GR21. In fact one pulse train would be used for both the calling circuit to audio link and to register connections and another for both the called circuit to audio link and to register connections as will be described later.

In time division multiplex communications systems it is common to transmit over the common leads pulses which are of shorter duration than the pulses effective in the modulator pairs. This is achieved by inserting a further modulator to which a pulse is applied over a pulse lead in the common lead. The pulse train so applied consists of pulses which are coincident with, but of shorter duration than all the pulses comprising the group of time spaced pulse trains which may be applied to the modulator pairs. The effects of so reducing the width of the pulses transmitted are that adjacent channel cross talk is reduced and that in the receiver modulator, pulses are gated by longer pulses so that slight delays through the transmission means will not cause any mis-gating due to slicing off the back edge of the pulse. Clearly the introduction of this additional modulator may be applied to this invention.

In U.S. Patent No. 2,716,731 granted to T. H. Flowers and J. E. Flood and in U.S. patent application Serial No. 276,306 in the names of J. E. Flood and S. D. Harper modulator circuits are described which are suitable for use in embodiments of this invention. It will be clear to those skilled in the art that common amplifiers, additional modulators or additional stages of modulation may be inserted at suitable points in the communication systems based on the type described.

In U.S. patent application Serial No. 402,896 in the name of L. R. F. Harris a method is described for distributing pulse trains to groups of units in which a pulse train in a set of pulse trains is required to be made effective in only one unit in the group and in which the generated pulses are effective only in the modulator pair associated with the timing devices producing coincident pulses. The timing devices in this arrangement may, for example, be mercury delay line circulating systems, storage elements, electric delay line circulating systems or other appropriate means.

A basic problem in telephone exchange switching systems is the selection of one, and one only of a number of circuits which are equally suitable for making a connection. In U.S. Patent No. 2,727,094 granted to T. H. Flowers and S. D. Harper and L. R. F. Harris apparatus is described which may be used for the selection and indication of one circuit out of a group of circuits.

Alternative selecting techniques are described in the U. S. Patent application Serial No. 404,760 in the name of L. R. F. Harris. These selecting techniques find application in embodiments of this invention. According to a feature of this invention the selecting devices may be made common to all the groups of circuits in the exchange. Where two stages of selection are used the selection of a particular circuit involves the selection of a group using one selecting device and a subsequent selection of a circuit in that group using a second selecting device common to all the groups of circuits but used at any one time only for the selected group of circuits.

Figure 4A:
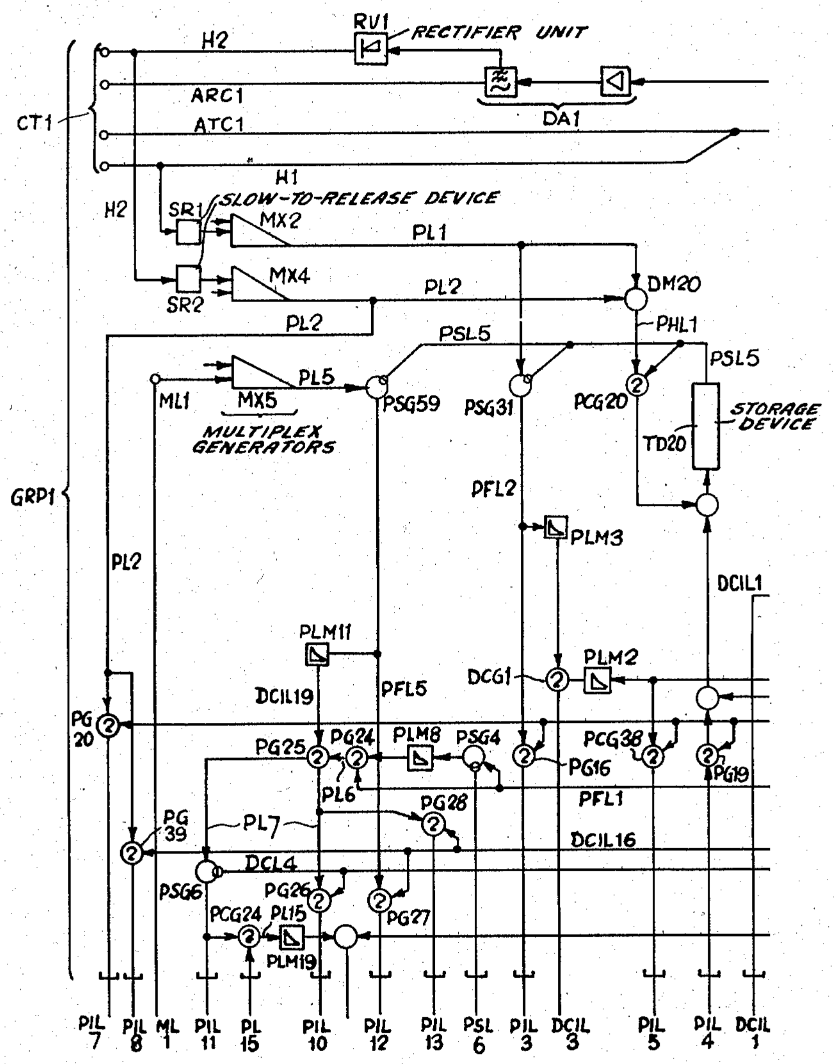
Figure 4B:
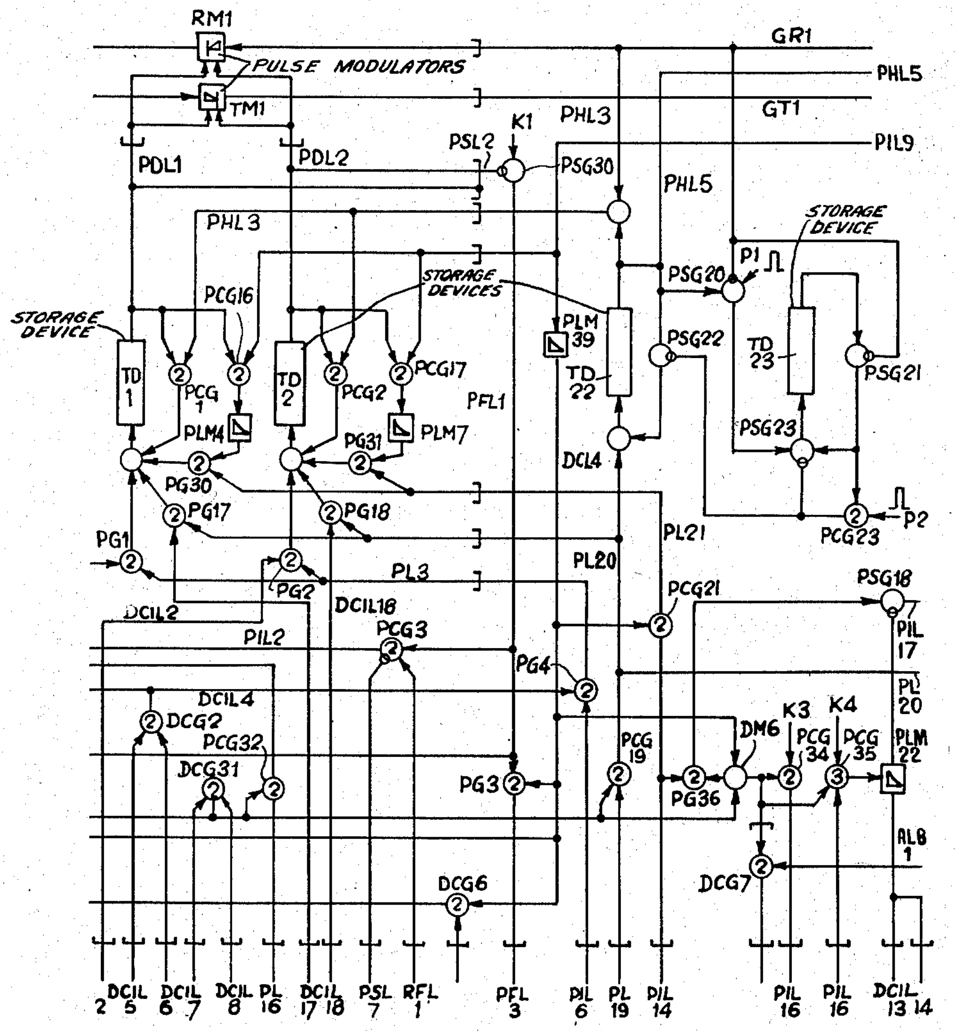
Figure 5A:
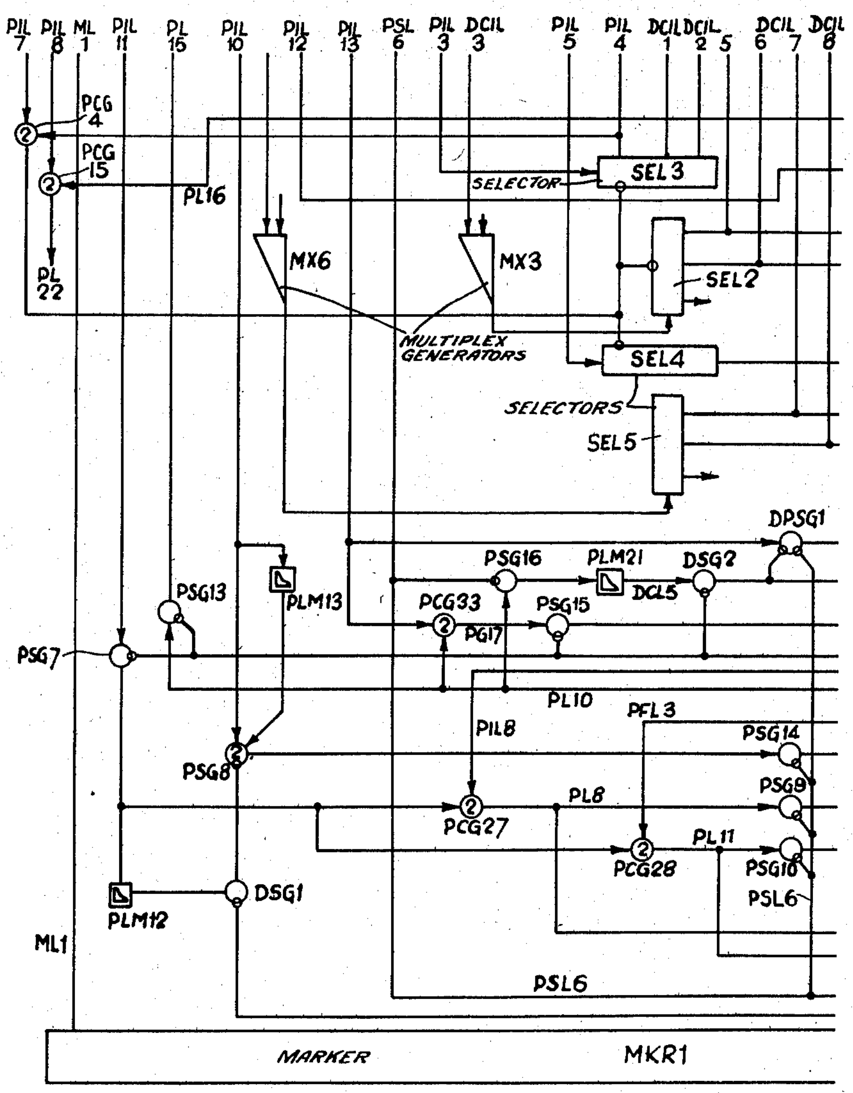
Figure 5B:
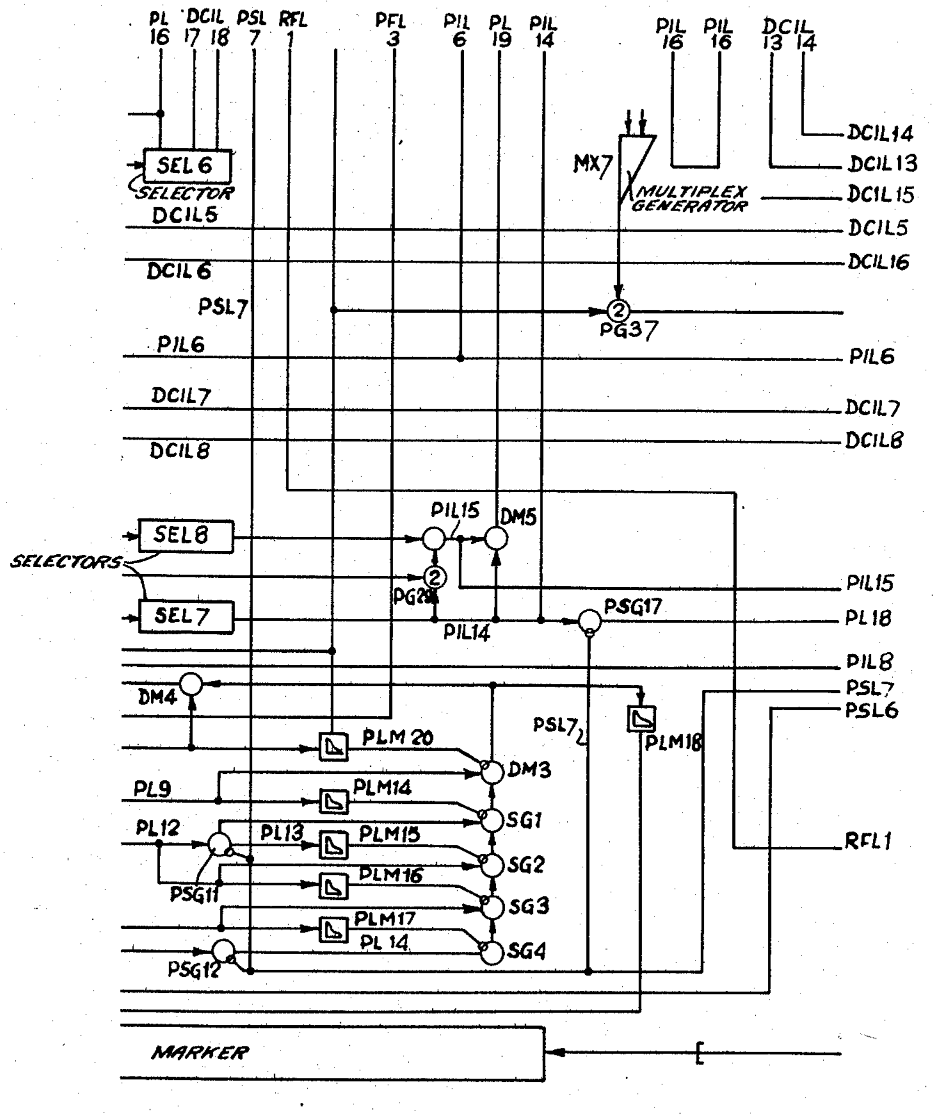
Figure 6A:
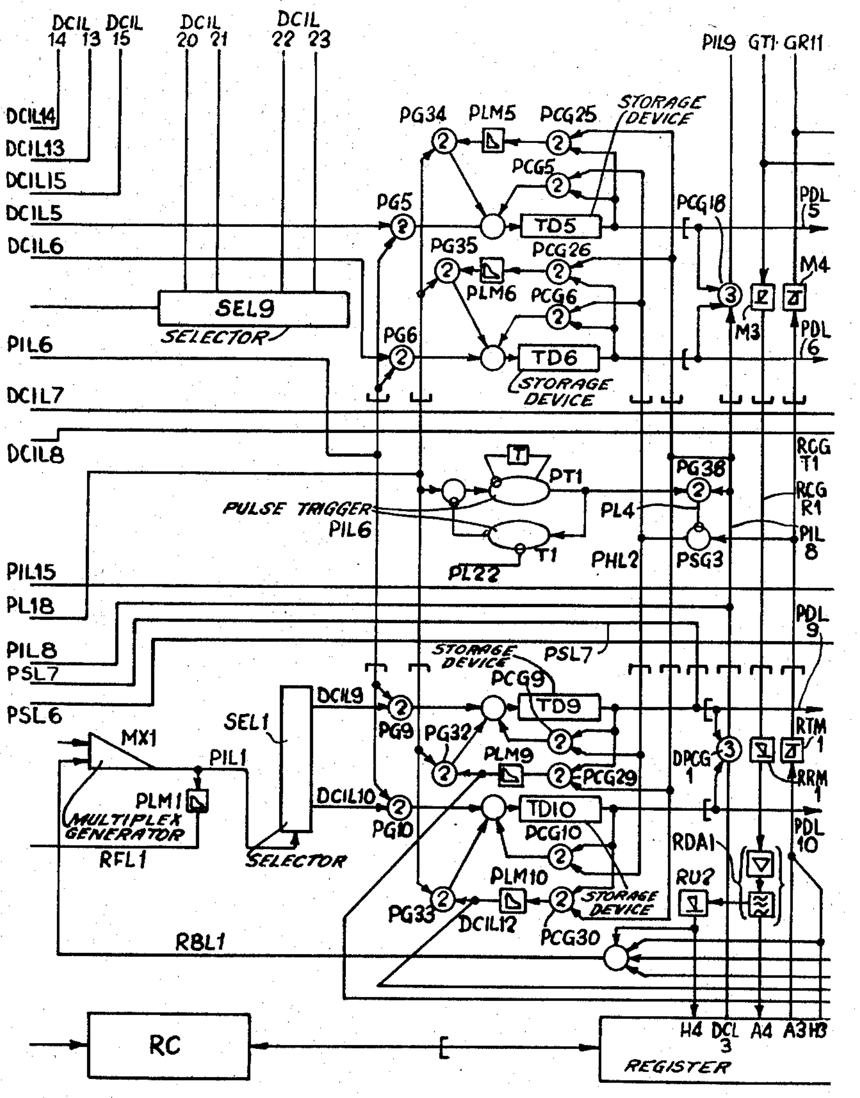
Figure 6B:
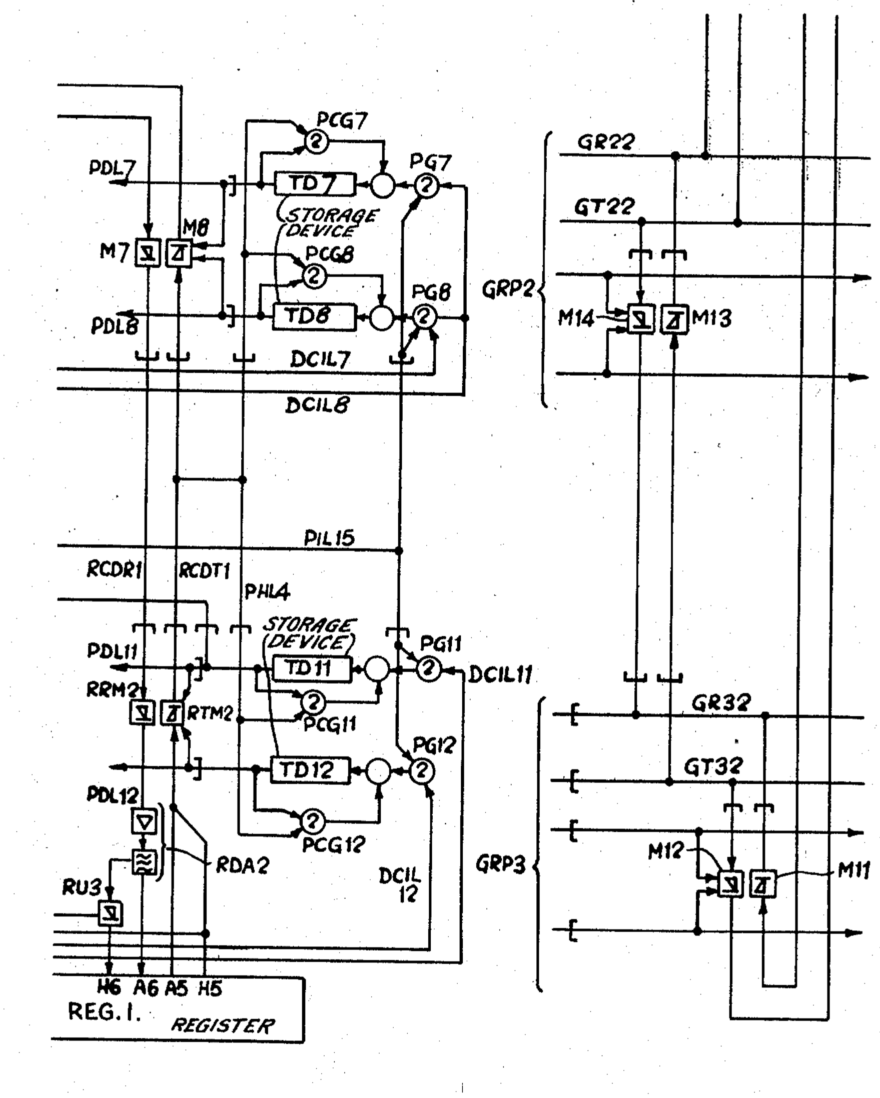
Figure 7A:
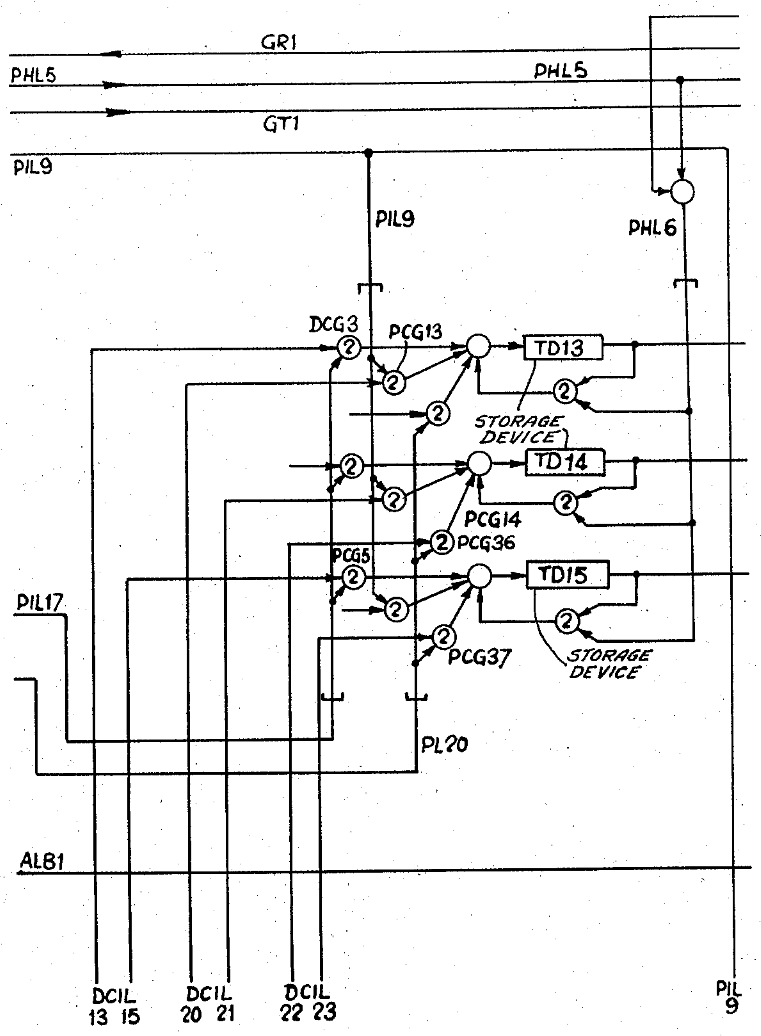
Figure 7B:
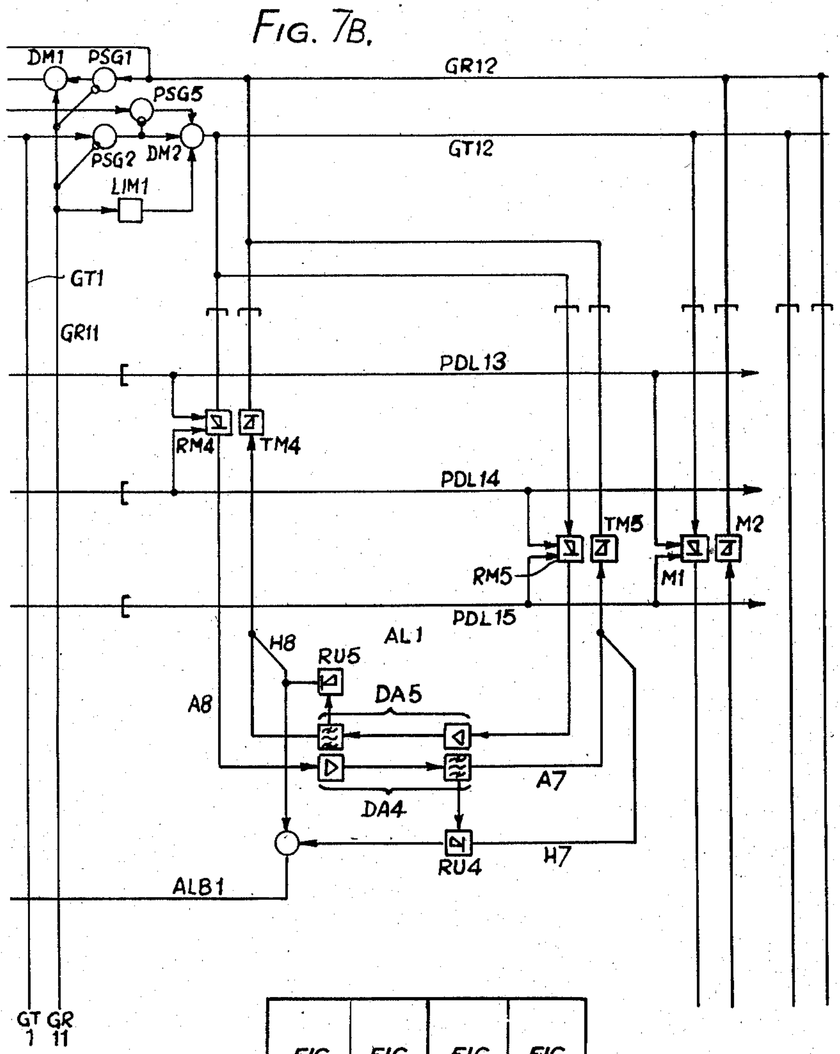
Figure 8:
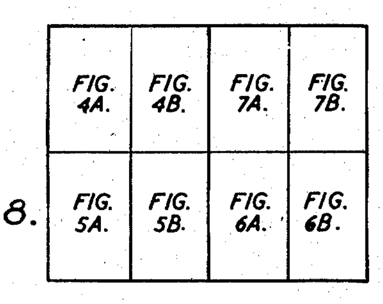

In the diagram consisting of Figs. 4A, 4B, 5A, 5B, 6A, 6B, 7A and 7B arranged as shown in Fig. 8 one circuit CT1 is shown at the top left hand corner of Fig. 4A and at the point where it is connected to the exchange transmission means, comprises a transmit audio pair ATC1, a receive audio pair ARC1 and hold leads H1 and H2. Pair ATC1 and lead H1 are connected to a transmit modulator TM1. Circuit CT1 is one circuit of a group GRP1 and the outputs of all the transmit modulators such as TM1 of the circuits in the group GRP1 are connected to a group transmit common lead GT1. The group receive common lead GR1 of group GRP1 is connected to receive modulators associated with each circuit in group GRP1 for example to RM1, the receive modulator of circuit CT1. The output of modulator RM1 is conected to a receive amplifier, demodulator and low pass filter DA1, the output of which is connected to pair ARC1. If modulator RM1 is transmitting pulses from GR1 to DA1 a D.C. hold signal is derived in rectifier unit RU1 from the output of DA1 and this hold signal appears on hold lead H2. TM1 and RM1 are connected for the purposes of pulse distribution to pulse distribution leads PDL1 and PDL2 which form a combination, individual to circuit CT1, of two pulse leads in a set of pulse leads used to distribute pulses to the modulator pairs of the circuits of group GRP1.

Group common leads GT1, and GR11, which is connected to GR1 via decoupling means DM1, are connected to register calling common lead pair RCGR1 and RCGT1 respectively via a pair of modulators M3 and M4 respectively, used for connections between calling circuits in group GRP1 and the registers. Other group common lead pairs are similarly connected to RCGT1 and RCGR1 via other pairs of modulators. The modulator pair M3 and M4 is connected for the purposes of pulse distribution to pulse distribution leads PDL5 and PDL6 which form a combination, individual to group GRP1, of two pulse leads in a set of pulse leads used to distribute pulses to the modulator pairs connecting group common lead pairs to the register calling common lead pair. Group common leads GT1 and GR11 are also connected to register called common lead pair RCDR1 and RCDT1 respectively via modulators M7 and M8 respectively, used for connections between called circuits in group GRP1 and the registers. Other group common lead pairs are similarly connected to RCDR1 and RCDT1 via other pairs of modulators. The modulator pair M7 and M8 is connected for the purposes of pulse distribution to pulse distribution leads PDL7 and PDL8 which form a combination, individual to group GRP1 of two pulse leads in a set of pulse leads used to distribute pulses to the modulator pairs connecting the group common lead pairs to the register called common lead pair.

Register calling common lead pair RCGT1 and RCGR1 and register called common lead pair RCDT1 and RCDR1 are both connected to the registers via pairs of modulators. Figs. 6A and 6B show one register REG1 which is connected to the exchange transmission means over a calling transmit audio pair A3, a calling receive audio pair A4, a calling transmit hold lead H3, a calling receive hold lead H4 and corresponding called leads A5, A6, H5 and H6. Audio pair A3 and hold lead H3 are connected to transmit modulator RTM1 used to connect REG1 to RCGT1. A5 and H5 are connected to transmit modulator RTM2 used to connect REG1 to RCDT1. RCGR1 is connected to calling receive modulators associated with each register, thus RCGR1 is connected to RRM1, the calling receive modulator of REG1 and RCD1 is similarly connected to called receive modulators associated with each register, thus RCDR1 is conected to RRM2, the called receive modulator of REG1. The outputs of RRM1 and RRM2 are connected to receive amplifiers and demodulators RDA1 and RDA2 respectively and thence to A4 and A6 respectively. If RRM1 or RRM2 is transmitting pulses from RCGR1 or RCDR1 to RDA1 or RDA2, a D.C. hold signal is derived from the output of RDA1 or RDA2 by rectifier units RU2 or RU3 so that the hold signal appears on hold lead H4 or H6 respectively.

The modulator pair RTM1 and RRM1 is connected for the purposes of pulse distribution to pulse distribution leads PDL9 and PDL10 which form a combination, individual to REG1, of two pulse leads in a set of pulse leads used to distribute pulse trains to the modulator pairs connecting the register calling common lead pair to the registers. Similarly the modulator pair RTM2 and RRM2 is connected to PDL11 and PDL12 forming a combination, individual to REG1, of two pulse leads in a set of pulse leads used to distribute pulse trains to modulator pairs connecting the called register common leads to the registers.

If register REG1 is busy, hold signals appear on all or some of the hold leads H3, H4, H5 and H6 and the presence of a hold signal on any of these is used to indicate that REG1 is busy. H3, H4, H5 and H6 are connected via suitable decoupling means to register busy lead RBL1.

Group transmit common lead GT1 is connected via pulse suppression gate PSG2 and decoupling means DM2 to lead GT12 which forms a pair with GR12. GR12 is connected via pulse suppression gate PSG1 and decoupling means DM1 to GR1. Lead GR11 is connected to pulse suppression gates PSG2 and PSG1 so that pulses are not transmitted through PSG2 and PSG1 if they coincide with pulses on GR11. GR11 is connected via limiter LIM1 to DM2 so that a coincident unmodulated low amplitude version of the pulse trains on GR11 appears on GT12. The output of PSG2 is connected to pulse suppression gate PSG5 to which pulse hold lead PHL5 is connected so that pulses applied on PHL5 to PSG5 are suppressed in PSG5 if coincident pulses appear on the output of PSG2. The output of PSG5 is connected via DM2 to GT12.

Pairs of leads corresponding to GR12 and GT12 are shown in Fig. 6B for two other groups of circuits GRP2 and GRP3. Thus GR22 and GR32 of groups GRP2 and GRP3 correspond to GR12 of group GRP1 and GT22 and GT32 of groups GRP2 and GRP3 correspond to GT12 of group GRP1. The group common lead pairs of each group are connected via pairs of modulators to the group common lead pairs of every other group. Thus group common lead pair GT12 and GR12 are connected to group common lead pair GR22 and GT22 via pulse modulator circuits M1 and M2 and to GR32 and GT32 via modulator circuits M11 and M12. Similarly GR22 and GT22 are connected to GT32 and GR32 via pulse modulator circuits M13 and M14 and other group common lead pairs are similarly interconnected.

Each group common lead pair is also connected to a number of pairs of modulator pairs connected together by audio links. Fig. 7B shows one such audio link AL1 for group GRP1 comprising two audio pairs A7 and A8, one for each direction of transmission. GT12 is connected to receive modulators RM4 and RM5 the outputs of which are connected to amplifiers, demodulators and low pass filters DA4 and DA5 respectively, whose outputs are connected to audio pairs A7 and A8 and also to RU4 and RU5 respectively which generate a D.C. hold signal on leads H7 and H8 if RM4 or RM5 is transmitting pulses from GT12. The audio pair A7 and hold lead H7 are connected to transmit modulator TM5 and A8 and H8 are connected to transmit modulator TM4. The outputs of TM4 and TM5 are connected to GR12. Such audio links are used to connect two circuits in the same group and one modulator pair RM4 and TM4 of audio link AL1 would be pulsed by the pulse train used by the calling circuit and the other modulator pair RM5 and TM5 by the pulse train used by the called circuit. If audio link AL1 is busy a hold signal appears on either or both of the hold leads H7 and H8, which are connected via suitable decoupling means to the audio link busy indicating lead ALB1, the potential of which indicates whether or not audio link AL1 is busy.

Modulator pairs RM4 and TM4, RM5 and TM5, and M1 and M2 are connected for the purposes of pulse distribution to pulse distribution leads PDL13 and PDL14, PDL14 and PDL15, and PDL13 and PDL15 respectively which form combinations, individual to the pairs of modulators, of two pulse leads each from a set of pulse leads used to distribute pulses to the modulator pairs of the audio links and to the modulator pairs connecting the group common channels of GRP1 to some of the other group common channels. It should be noted that the modulator pairs connecting two group common channels may be associated with either group for the purposes of pulse distribution. Thus M1 and M2 are associated with group GRP1 but M11 and M12 connecting GRP1 and GRP3 are associated with group GRP3 for the purposes of pulse distribution.

Each pulse distribution lead in all of the sets described is associated with a timing device which may be operated to generate on its associated pulse lead any combination of the pulse trains which may be used for connections through the exchange. Thus PDL1, PDL2 . . . PDL15 are associated with timing devices, which may be, for example, mercury delay line circulating systems, TD1, TD2 . . . TD15 respectively. To cause a particular pulse train to become effective in a particular modulator pair, it is necessary to cause both the timing devices associated with the modulator pair to generate that pulse train. Once a timing device has been caused to generate a particular pulse train it must continue to do so for as long as required.

The method of establishing and holding connections through the system will now be described with reference to Figs. 4A, 4B, 5A, 5B, 6A, 6B, 7A and 7B.

When an external circuit calls, it is first connected to a free register. This may be achieved only if there is at least one free register and if there is at least one pulse train in the set of pulse trains used for connections which is not being generated either by any of the timing devices distributing pulses to the modulators of the circuits in the group of circuits which includes the calling circuit or by any of the timing devices distributing pulses to the modulators connecting the calling register common lead pair to the registers.

The free pulse trains in the two groups must be compared and one of the common free pulse trains must be selected for the connection.

Register busy lead RBL1 is connected to multiplex pulse generator MX1 which generates a pulse train which is individual to REG1 when REG1 is free. Similarly MX1 may generate other pulse trains, one for and individual to each register, to indicate other free registers. The pulse trains of all the free registers appear on pulse indicating lead PIL1 which is connected to register selector SEL1 which selects one of the free registers and indicates the selection on a combination of D.C. indicating leads individual to the selected register. The combination corresponds to the combination of pulse leads associated with the selected registers modulator pair used to connect it to the register calling common lead pair. Thus if REG1 is the selected register, it is indicated on D.C. indicating leads DCIL9 and DCIL10 corresponding with timing devices TD9 and TD10. As will be described later a calling circuit will be selected and connected to the selected register.

Lead PIL1 is connected to pulse lengthening means PLM1 which D.C. indicates on its output register free lead RFL1 whether there are any pulses on PIL1 and therefore whether there is a free register. It should be noted that a register which is selected by SEL1 but not yet connected to a calling circuit, is still indicating its free condition to MX1 and its pulse train therefore still appears on lead PIL1.

The outputs of all the timing devices which are used to distribute pulses to the calling modulators of the registers, as for example TD9 and TD10, are connected via suitable decoupling means to pulse suppression lead PSL7 which thus indicates those pulse trains unsuitable for use in a new connection between a calling circuit and a register.

Within each group the outputs of all the timing devices used to distribute pulses to the circuit modulator pairs, as for example TD1 and TD2 are commoned via suitable decoupling means to a pulse suppression lead, for example PSL2 in group GRP1 on which appear pulse trains unsuitable for use in connections to circuits in group GRP1. PSL2 is connected to pulse suppression gate PSG30 to which all the pulse trains which may at any time be used in connections to GRP1 are applied over pulse lead K1. Those pulses in use in the circuit modulator pairs of the group are suppressed in PSG30 and on its output lead PFL1 appear only the free pulse trains suitable for use in a new connection to circuits in group GRP1.

Lead PFL1 is connected to pulse gate PCG3 to which PSL7 and RFL1 are also connected. PCG3 and corresponding gates in other groups do not transmit the applied pulses to their output leads if RFL1, which is connected to all such gates, indicates that no register is free. If there is at least one free register, those pulse trains on PFL1 which do not coincide with those on PSL7 are transmitted to the output lead PIL2 of PCG3. Thus, if there are any free registers, the pulse trains suitable for connections between calling circuits in group GRP1 and the registers will appear on lead PIL2 connected to pulse lengthening means PLM2 which D.C. indicates on its output lead whether a calling circuit in group GRP1 can be connected to a free register. Corresponding indications are derived in like manner for other groups in the exchange.

In a group, each circuit is associated with one pulse train, individual to it, in a set of time spaced pulse trains used for pulse indicating the circuits. When a circuit, for example CT1, is ether already connected through the exchange or applying for connection, a hold signal is applied to the exchange. For example if CT1 is a subscriber's line, the completion of a D.C. loop on the line will cause the appearance of a hold signal on transmit hold lead H1. Lead H1 is connected via slow to release device SR1 to a multiplex pulse generator MX2 which generates the pulse trains of all those circuits which have a hold signal on their transmit hold leads. The function of the slow to release device SR1 and the similar devices associated with other circuits is to ensure that the pulse trains generated by MX2 do not disappear during short breaks in the applied hold signal, for example due to dialled impulses. The output of MX2 on lead PL1 is applied to pulse suppression gate PSG31 in which the pulse trains of those circuits already selected are suppressed. The pulse trains of busy circuits appear on pulse suppression lead PSL5 whose operation will be described later. On the output lead PFL2 of PSG31 will appear the pulse trains of calling circuits in group GRP1 which are waiting to be connected to free registers. PFL2 is connected to pulse lengthening means PLM3 which D.C. indicates whether group GRP1 includes a circuit calling for connection to a register. Corresponding indications are derived in like manner for other groups in the exchange.

The outputs of PLM2 and PLM3 are both connected to D.C. coincidence gate circuit DCG1 which indicates on its output lead DCIL3 the condition that GRP1 includes a circuit calling for connection to a free register and whether it is possible to make such a connection. There may be more than one group in this condition and one of them must be selected as the first stage in the selection of one of the circuits calling for connection to the selected register.

Each group of circuits is associated with one pulse train in a set of time spaced pulse trains used for pulse indicating the groups. The D.C. output from DCG1 is connected by lead DCIL3 to multiplex pulse generator MX3 as are similar indicating leads for other groups. MX3 generates the pulse trains of those groups in which there is at least one calling circuit connectible to the selected free register. These pulse trains are applied to calling group selecting means SEL2, in which one of the groups is selected and indicated on a combination of D.C. indicating leads individual to the selected group. That combination corresponds to the combination of pulse leads associated with the modulator pair which connects the common lead pair of the selected group to the register calling common lead pair. Thus if GRP1 is the selected group, this fact is indicated on D.C. indicating leads DCIL5 and DCIL6. The combination of D.C. indicating leads associated with a group is connected to a coincidence gate associated with said group and thus DCIL5 and DCIL6 are connected to DCG2 associated with group GRP1. The outputs of the coincidence gates indicate on leads individual to the groups which of them is the selected one and if GRP1 is selected, this fact is indicated by the signal on DCIL4.

Having selected a group and a register, it remains to select a calling circuit within the selected group and a pulse train suitable for connecting the selected register to the selected calling circuit. If GRP1 is the selected group, the signal on DCIL4 connected to gate PG16 causes the pulse trains of the calling circuits in the selected group, applied from MX2 on PFL2 to be transmitted to the common circuit pulse indicating lead PIL3. PIL3 is connected to circuit selecting means SEL3 which selects a calling circuit in the selected group. The selected calling circuit is D.C. indicated on a combination of D.C. indicating leads corresponding to the combination of pulse leads used for distributing pulse trains to the modulator pair of the selected circuit. It will be appreciated that SEL3 indicates the combination of pulse leads to be used but does not identify the circuit since the same combination of leads may be associated with different circuits in different groups and to identify a circuit it is also necessary to indicate the group. It will be clear that circuits in different groups are associated for the purposes of pulse indication with the coincident pulse trains and each such circuit will be associated with the same combination or pattern of timing devices. If the selected pattern corresponds to that of CT1 in group GRP1, this fact is indicated on leads DCIL1 and DCIL2 connected to timing devices in all the groups of circuits. The selected pattern is also pulse indicated by its associated pulse train on lead PIL4 and this will coincide with the pulse train of the selected circuit. Lead PIL4 is connected to pulse gates associated with each group and the one associated with selected group transmits the applied pulse train. Thus if GRP1 is the selected group, the indication on DCIL4, generated by SEL2 when GRP1 is selected, allows PG19 to transmit the pulses on PIL4 to the timing device TD20 which becomes operated to generate the pulse train of the selected circuit on lead PSL5, connected to pulse suppression gate PSG31. TD20 generates the pulse trains of each circuit in GRP1 which has already been selected for as long as it remains connected. The storage of the selected circuit's pulse trains is maintained by applying coincident pulse trains over pulse maintaining lead PHL1 connected to pulse coincidence gate PCG20 which may be in the recirculation path of a mercury delay line circulating system if that is the apparatus used for TD20. PHL1 is connected via decoupling means DM20 to lead PL1 which is the output lead of MX2 already described. PHL1 is also connected via DM20 to lead PL2, the output of multiplex pulse generator MX4 which generates the pulse trains of those circuits in the group, held from within the exchange. Thus if a hold signal appears on H2, MX4 generates the pulse train of circuit CT1 on lead PL2. Slow to release devices, as SR2, are interposed between hold leads, as H2, and MX4 and they ensure that the pulse trains generated do not disappear during short breaks in the applied hold, due to accidental breaks for example. So long as a hold signal is present on either hold lead of a circuit, its associated pulse train appears on PHL1 and once the circuit has been selected its pulse train will continue to appear on PSL5 until both hold signals disappear.

Lead DCIL4 which indicates whether GRP1 is the selected group, is also connected to gate PCG38 which, when GRP1 is the selected group, transmits the pulse trains suitable for connecting the selected calling circuit to the selected register from lead PIL2 over common pulse indicating lead PIL5 to pulse train selecting means SEL4. SEL4 selects one of said suitable pulse trains and pulse indicates the selected pulse train on lead PIL6.

It is now necessary to operate the timing devices associated with the selected circuit's modulator pair, associated with the modulator pair on the calling side of the selected register and associated with the modulator pair used to connect the selected group's common lead pair to the register calling common lead pair.

Lead PIL6 is connected to gates associated with each timing device in the set of timing devices used to distribute pulse trains to the modulator pairs on the calling side of the registers and the combination of these which is D.C. indicated by SEL1 transmits the selected pulse train to their associated timing devices which then generate that pulse train thus causing it to be effective in the modulator pair on the calling side of the selected register. Thus if REG1 is selected, the D.C. indication on DCIL9 and DCIL10 opens gates PG9 and PG10 which transmit the selected pulse train applied to them on PIL6 to timing devices TD9 and TD10 causing them to generate that pulse train on leads PDL9 and PDL10.

Lead PIL6 is also connected to gates associated with each timing device in the set of timing devices used to distribute pulse trains to the modulator pairs connecting group common lead pairs to the register calling common lead pair and the combination of these, which is D.C. indicated by SEL2 transmit the selected pulse train to the associated timing devices which become operated to generate that pulse train, which thus becomes effective in the modulator pair connecting the selected groups common lead pair to the register calling common lead pair. Thus if GRP1 is the selected group, the D.C. indication on DCIL5 and DCIL6 opens gates PG5 and PG6 which transmit the selected pulse train applied on lead PIL6 to timing devices TD5 and TD6 causing them to generate said pulse train on leads PDL5 and PDL6.

Lead PIL6 is also connected to gates associated with each group to which the D.C. indicating lead, as DCIL4 is connected. In the selected group the D.C. indication thereon opens its gate to transmit the pulse train on lead PIL6 to gates associated with each timing device in the set of timing devices used to distribute pulses to the modulators of the group's circuits. The combination of these gates which is D.C. indicated by SEL3 transmits the selected pulse train to their associated timing devices which then generate the selected pulse train which is thus made effective in the modulator pair of the selected calling circuit. Thus if circuit CT1 in group GRP1 is the selected calling circuit, the D.C. indication on DCIL4 opens gate PG4 which transmits the selected pulse train applied on PIL6 to PL3 and the D.C. indication on DCIL1 and DCIL2 opens gates PG1 and PG2 which transmit the selected pulse train applied on PL3 to timing devices TD1 and TD2 causing said pulse train to appear on pulse leads PDL1 and PDL2.

The presence of the hold signal on the hold lead connected to the transmit modulator of the selected calling circuit then causes the selected pulse train to appear on the common transmit lead of the selected group. This will be transmitted through the modulator connecting said common lead to RCGR1 and thence through the receive modulator RRM1 on the calling side of the selected register. After a few pulses a hold signal will appear on the calling receive hold lead, such as H4, and the register will indicate its busy condition on its busy indicating lead, such as RBL1. The receipt of such a hold signal can, by known techniques, initiate a transmit hold signal on the calling transmit hold lead, such as H3, causing the selected pulse train to appear on RCGT1. This will be transmitted through the modulator connecting RCGT1 to the common receive lead of the selected group and thence through the receive modulator such as RM1 of the selected calling circuit where after a few pulses, a hold signal will appear on the receive hold lead, such as H2, and this will cause the pulse train of the selected circuit to be generated by the multiplex, as MX4. If the selected circuit is in group GRP1, the pulse train individual to the selected circuit will thus appear on lead PL2. This lead is connected to a gate PG20 which has been opened by the D.C. indication on DCIL4 if GRP1 is the selected group. The gate PG20 then transmits the pulse trains on lead PL2 to common pulse indicating lead PIL7. Those pulses are compared in pulse coincidence gate PCG4 with those on lead PIL4 which is pulse indicating the selected circuit. As soon as the pulse train on PIL4 coincides with one on PIL7 it is known that all the selecting and setting up operations have been completed and that there is at least pulse transmission in both directions between the calling circuit and the register. The output of PCG4 is used to release the selecting means SEL1, SEL2, SEL3 and SEL4 by the use of techniques described in the specification of U.S. Patent No. 2,727,094 granted to T. H. Flowers, S. D. Harper and L. R. F. Harris.

The presence of a transmit hold signal on the calling side of the register causes the pulse train used in the register's connection to a calling circuit to appear on RCGT1 and this is connected to the timing devices in the sets of timing devices used to distribute pulse trains to the register calling modulator pairs and to the intermediate modulator pairs connecting the group common lead pairs to the register calling common lead pair. RCGT1 is connected to said timing devices via pulse suppression gate PSG3 in which a pulse train may be suppressed by the application of a coincident pulse train on lead PL4. The output of PSG3 is used to maintain the storage of the pulse trains in the appropriate timing devices. This may be achieved by applying the pulses on maintaining lead PHL2, the output lead of PSG3 to coincidence gates in the circulation paths of mercury delay line circulating system timing devices. For example PHL2 is connected to gates PCG5, PCG6, PCG9 and PCG10 associated with timing devices TD5, TD6, TD9 and TD10 respectively and if a connection is between a calling circuit in group GRP1 and REG1, the pulse train used is kept circulating in these four timing devices until the hold signal on H3 disappears so causing the pulse train to disappear from PHL2. The pulse train may also be prevented from circulating by the appearance of a coincident pulse on PL4. The circumstances under which this would happen will be described later.

In a connection between a calling circuit in group GRP1 and REG1 the presence of the hold signal on H3 also causes the pulse train used to appear on leads GR11 and GR1. The presence of the pulse train on GR11, connected to pulse suppression gates PSG1 and PSG2 prevents the transmission of the pulse train through them. GR11 is also connected to limiter LIM1 and a low amplitude version of the pulse train will appear on GT12. The presence of the pulse train on GR1 connected to pulse maintain lead PHL3 is used to maintain the storage of the pulse train in the appropriate timing devices in the set of timing devices used to distribute pulse trains to the calling modulator pairs of GRP1. Thus PHL3 is connected to PCG1 and PCG2, associated with timing devices TD1 and TD2 respectively and if a pulse train appears on lead PHL3 which coincides with one on the outputs of the timing devices, the storage of the pulse train is maintained.

Thus the connection between a calling circuit and a register is held by the register and releases only when the register removes its transmit hold on the calling side. It has so far been shown how a calling circuit is connected to a register and it is clear that many such connections can exist simultaneously using different pulse trains. It remains to be shown how the calling circuit becomes connected to the called circuit.

Once a calling circuit has become connected to a register, the register will receive designation information coded, for example, as dialled pulses or pulses of V.F. signals, etc. This information may be stored in the register using known techniques. When sufficient information is stored in a register for it to start setting up the connection the register is connected via a suitable register connector RC to the common marker MKR1 which receives the designation information stored in the register and indicates the circuits, one of which is required to be connected to the calling circuit connected to the register which is connected to the marker, hereafter referred to as the calling circuit and the register respectively. The marker indicates circuits suitable for the connection by D.C. indication on a lead common to them. For private subscribers' lines, usually only one circuit will be marked, but if a P.B.X group is indicated, all the circuits in the group are indicated by a common indicating lead and similarly for junctions to another exchange. It is assumed herein that these functions of a register and marker are known and that they are performed by known techniques.

As has already been described it is necessary to be able to connect a called circuit to the same register as the calling circuit and also to prepare the connection between the calling and called circuits. To make the first connection it is necessary to find a pulse train which is not in use in the modulator pairs of a group which includes a free called circuit and also not in use in any of the modulator pairs on the called side of the registers. If such a pulse train can be found, a connection between a called circuit and the register can be made. To make a connection between two circuits in different groups it is also necessary to find a pulse train which is not in use in the group of modulator pairs of a group of circuits in which there is a free called circuit which can be connected to the register and which is also either not in use in the modulator pairs of the calling circuit's group, or which is already in use in the connection of the calling circuit to the register. For such a connection between circuits in different groups it is necessary to ensure that the pulse train used for the calling to called circuit connection coincides with either or both of those used for the connections between them and the register.

These requirements are met if the pulse train used for the calling circuit to register connection is not in use in the modulator pairs on the called side of the registers or in the modulators of a free called circuit's groups modulator pairs. All three connections then use the same pulse train. They are also met if a pulse train can be found free in the modulator pairs of the calling circuit's group, a free called circuit's group and the register's calling and called groups. Again all three connections may use the same pulse train but it is necessary to change the pulse train used in the calling circuit to register connection when setting up the other connections. The requirements are also met if a pulse train can be found free in the modulator pairs of the calling circuit's group and another pulse train found free in the called circuit's group and the register's called group. The calling circuit to register then continues to use the same pulse train and a second pulse train is used for the other two connections. The requirements are also met if the pulse train used in the calling circuit to register connection is free in the modulator pairs of a free called circuit's group from which a connection can be made to the called side of the register and also free in the modulator pairs of the called side of the registers. The calling circuit to register connection then continues to use the same pulse train which is also used for the calling to called circuit connection and a second pulse train is used for the called circuit to register connection. The requirements are also met if a pulse train can be found which is free in the modulators of the calling circuit's group, of the register's calling group and of a free called circuit's group whose circuits can be connected to the register's called side. The calling circuit to register connection is changed during the setting up of the connection and then uses the same pulse train as the calling to called circuit connection. Another pulse train is used for the called circuit to register connection. Any of these patterns of pulse train arrangement meet the requirements and which pattern is used depends upon the pulse trains which are free in the various groups when the connection is set up.

If the connection between two circuits in different groups cannot be made because a free pulse train cannot be found, but there is a free called circuit in the calling circuit's group which can be connected to the register, then connection between the calling circuit to called circuit is made via an audio link. The calling to register pulse train is also used to connect the calling circuit to the audio link and the called circuit to register pulse train is also used to connect the called circuit to the audio link.

To set up such connections it is necessary to know the pulse trains free in the various groups and to identify the calling circuit and group. There are various ways in which the suitable pulse trains, groups and circuits may be ascertained and selected. One method will now be described by way of example, with reference to Figs. 4A, 4B, 5A, 5B, 6A, 6B, 7A and 7B.

The group which includes the calling circuit is indicated by the appearance of a D.C. signal, generated by the register connected to the marker, which causes the pulse train used in the connection from the calling circuit to the register to appear on pulse indicating lead PIL8. Thus if REG1 is the register connected to the marker, a D.C. potential is applied by REG1 on DCL3 connected to D.C. and pulse pulse coincidence gate DPCG1 to which PDL9 and PDL10 are also connected. This D.C. potential causes the pulse train appearing coincidently on PDL9 and PDL10 to be transmitted to PIL8. PIL8 is similarly connected to gates associated one with each register and to each such gate the associated register's combination of pulse leads is connected.

PIL8 is also connected to gates, one for each group of circuits, to which are connected the combinations of pulse leads connected to the modulator pairs which connect the common lead pairs to the register calling common lead pair. The pulse train is only transmitted through the gate associated with the group which includes the calling circuit. Thus PIL8 is connected to PCG18 to which leads PDL5 and PDL6 are connected. If the calling circuit is in group GRP1 the pulses on PIL8 are transmitted through PCG18 to its output lead which is pulse indicating lead PIL9, individual to GRP1. PIL9 is connected to pulse lengthening means PLM39 which D.C. indicates on DCL4 whether GRP1 includes the calling circuit, to which a free called circuit is to be connected. DCL4 is connected to pulse gate PG3 to which the pulse trains, not already in use in GRP1 are applied on lead PFL1. If GRP1 includes the calling circuit, the D.C. signal on DCL4 opens PG3 which transmits said free pulse trains on PFL1 to pulse free indicating lead PFL3. PIL9 is also connected to pulse coincidence gates associated with each of the timing devices in the group GRP1, used to distribute pulses to the group's modulator pairs. In these pulse coincidence gates the pulse trains stored in the timing devices are compared with the pulse train on lead PIL9. The pulse coincidence gates of the timing devices forming the combination of the calling circuit will transmit the pulse train and if the outputs from these pulse coincidence gates are applied to pulse lengthening means, the calling circuit is D.C. indicated conveniently by the signals on the outputs of the said pulse lengthening means. Thus in group GRP1, PIL9 is connected to PCG16 and PCG17 which are associated with timing devices TD1 and TD2 respectively and to which PDL1 and PDL2 are connected. If CT1 is the calling circuit, the pulse train on PIL9 coincides with the pulse train which is stored in both TD1 and TD2 and the pulse train on PIL9 is transmitted through both PCG16 and PCG17. The outputs of PCG16 and PCG17 are connected to pulse lengthening means PLM4 and PLM7 respectively, whose outputs D.C. indicate that the calling circuit is CT1, or more exactly, that the timing devices TD1 and TD2 are the timing devices in group GRP1 which are associated with the calling circuit.

Thus the calling circuit, the calling circuit's group, the pulse train used for the connection between the calling circuit and the register and the free pulse trains in the calling circuit's group are all indicated when the register is connected to the marker. To change the pulse train used for the calling circuit to register connection, as is sometimes required, it is necesary to indicate the timing devices associated with the register and with the modulator pair connecting the common lead pair of the calling circuit's group to the register calling common lead pair. This is done by comparing the pulse train on PIL8 with the pulse trains generated by the timing devices used to distribute pulses to the modulator pairs on the calling side of the registers and to the modulator pairs connecting group common lead pairs to the register calling common lead pair. Thus lead PIL8 is connected to pulse coincidence gates associated one with each timing device in the two sets of timing devices, for example, PCG25, PCG26, PCG29 and PCG30 associated with TD5, TD6, TD9 and TD10 respectively leads PDL5, PDL6, PDL9 and PDL10 are connected to PCG25, PCG26, PCG29 and PCG30 respectively and if the pulse on PIL8 is transmitted through these four pulse coincidence gates it is known that group GRP1 is the calling circuit's group and that REG1 is the register. This is conveniently indicated by the outputs from pulse lengthening means to which the outputs of the pulse coincidence gates are connected. Thus the outputs of PCG25, PCG26, PCG29 and PCG30 are connected to pulse lengthening means PLM5, PLM6, PLM9 and PLM10 respectively and the D.C. outputs of these and the similar units associated with other timing devices in the sets indicate those timing devices in which the pulse train may have to be changed.

The set of output leads from the pulse lengthening means associated one with each timing device in the set used to distribute pulses to the modulator pairs on the calling side of the registers may also be used to indicate directly the timing devices to be used to distribute pulses to the modulator pair on the called side of the register. The combinations associated with the registers in the two sets of timing devices then correspond with each other. If REG1 is the register connected to the marker, the timing devices TD9 and TD10 are those used in the connection to the calling circuit and the outputs of PLM9 and PLM10 on leads DCIL11 and DCIL12 indicate this and they will also indicate that TD11 and TD12 are the timing devices to be used in the called circuit to register connection. Similarly other combinations of timing devices will be indicated when other registers are connected to the marker.

The outputs of all the timing devices distributing pulses to the modulator pairs on the called side of the registers are connected via suitable decoupling means to a common pulse suppression lead PSL6. On this lead appear all those pulse trains which are unsuitable for the connection between a free called circuit and the register.

As already described, those pulses not used to distribute pulse trains to the modulator pairs of a group appear on pulse free indicating leads such as PFL1 in group GRP1. Lead PFL1 is connected to pulse suppression gate PSG4 to which PSL6 is connected and the only pulse trains transmitted through PSG4 are those which are free, both in the group of modulator pairs of GRP1 and in the modulator pairs of the register's called side. If any pulse trains are so transmitted it means that called circuits in the group can be connected to the registers. The output of PSG4 is pulse lengthened in PLM8 which is connected to pulse gate PG24 to which PFL1 is also connected. Pulse trains on PFL1 are transmitted through PG24 to PL6 only if the output from PLM8 indicates that connection between a called circuit in the group can be made to a register. Corresponding leads to PL6 in other groups also indicate the pulse trains suitable for connection to called circuits in the groups, provided connection can be made to the register.

It has been shown so far how the following information may be indicated: the calling circuit's timing devices; the calling circuit's group, the free pulse trains in the calling circuit's group, the pulse train already used for the calling circuit to register connection, the timing devices used in connecting the calling circuit's group to the register calling common lead pair, the timing devices on the calling side of the register, the timing devices on the called side of the register, the pulse trains already in use in the group of register modulator pairs on the calling side, the pulse trains already in use in the group of register modulator pairs on the called side, the groups of circuits in which it is possible to connect a called circuit to a register and the pulse trains which are free in such a group's modulator pairs. It remains to be shown how all this information can be used to set up the required connections when a circuit or a number of circuits in one or several groups is indicated as being a suitable outlet for the connection through the exchange. It is convenient to assume that circuit CT1 in group GRP1 is among those suitable external circuits.

The marker MKR1 D.C. indicates the suitable circuits and a signal on marking lead ML1 is used to indicate that CT1 is among the suitable called circuits. ML1 is connected to multiplex pulse generator MX5 which when an indicating signal appears on leads such as ML1, causes the individual pulse trains of the D.C. indicated circuits to be generated on its output lead PL5. These pulse trains coincide in time with those generated by MX2 and MX4 when the same circuits are indicated by those multiplex pulse generators. Pulse lead PL5 is connected to pulse suppression gate PSG59 to which PFL5, on which appears the individual pulse trains of all the busy circuits, is connected, so that on PFL5 the output of PSG59, appear only those pulse trains of free called circuits indicated by the marker. Lead PFL5 is connected to pulse lengthening means PLM11 and its D.C. output lead DCIL19 indicates that group GRP1 includes at least one free called circuit. Corresponding leads in other groups similarly indicate which groups include free called circuits.

DCIL19 is connected to a pulse gate PG25 which transmits the pulse trains, if any, applied on PL6, when the signal on DCIL19 indicates that GRP1 includes a free called circuit. Thus pulse trains are only transmitted through PG25 to PL7 if GRP1 includes at least one free called circuit, and has free pulse trains, at least one of which can be used in a connection to the register on the called side. Pulse lead PL7 is connected to a common pulse indicating lead PIL10 via a pulse gate PG26 which is opened by the signal on lead DCL4 connected to it, when GRP1 is the calling circuit's group. Thus on lead PIL10 appear those pulse trains which are free in the calling circuit's group if that group includes at least one free called circuit and if it is known that a connection can be made. It is desirable to connect the calling circuit to a called circuit in a different group if possible and the free pulse trains in groups which include free called circuits, other than the group which includes the calling circuit, are indicated on a different free pulse indicating lead PIL11. Thus if group GRP1 includes the calling circuit, this fact is indicated on DCL4 which is connected to pulse suppression gate PSG6. This indication on DCL4 prevents the transmission of the free pulse trains, if any, on PL7 through PSG6, the output of which is connected via suitable decoupling means to PIL11. Thus on PIL10 appear the free pulses of the calling circuit's group if it includes at least one free called circuit and if called circuit in the group can be connected to the called side of the register and on PIL11 appear the free pulses of all such groups, other than that which includes the calling circuit.

The free pulse trains on PIL11 are applied to assemblage of circuits forming a "tree" which ascertains which pulse train pattern, if any, can be used to set up the required connections between circuits in different groups and which pulse trains may be used in such patterns. The "tree" has "branches" consisting of the following circuits extending from the output of pulse suppression gate PSG7:

(i) Pulse gate PCG27, lead PL8, pulse suppression gate PSG9 and lead PL9.
(ii) Pulse gate PCG28, lead PL11, pulse suppression gate PSG10, lead PL12, PSG11 and lead PL13.
(iii) Pulse gate PCG28, lead PL11, pulse suppression gate PSG10, and lead PL12.
(iv) Pulse gate PCG27, and lead PL8.
(v) Pulse gate PCG28, lead PL11 pulse suppression gate PSG12 and lead PL14.

PIL11 is connected to pulse suppression gate PSG7 in which the pulse trains may be suppressed as will be described later. The output of PSG7 is connected to the aforementioned tree and also to pulse lengthening means PLM12 the output of which D.C. indicates whether there is a group, other than the calling circuit's group, which includes a free called circuit which can be connected to the register's called side. The output of PLM12 unless suppressed in D.C. suppression gate DSG1, is used to prevent the pulse trains on PIL10 which may include free pulse trains from the calling circuit's group if that group includes a free called circuit which can be connected to the register from being presented to the selecting means. Thus the pulse trains on PIL10 are applied to pulse lengthening means PLM13 which is designed to have a build up time longer than that of PLM12, PIL10 and the output of PLM13 are connected to gate PSG8 (Fig. 5) to which the output of DSG1 is connected, so that PSG8 transmits the pulse trains on PIL10 sometime after pulses appear on PIL10 unless suppressed by the output of DSG1 the time depending upon PLM13. Thus, pulses are only transmitted through PSG8 if there is a free called circuit in the calling circuit's group, which can be connected to the register's called side and if there is no free called circuit in any other group which can be connected to the called side, or if pulse suppression gates PSG7 or DSG1 are controlled to prevent the suppression signal from being applied to PSG8.

Assume, first of all, that pulse trains do appear on the output of PSG7 and that PSG8 is closed by the signal from DSG1. This occurs when there is a free called circuit in a group different from the calling circuit's group. Under these conditions, the most desirable pattern is that occurring when the pulse train already used for the calling circuit to register connection is also used for the calling circuit to called circuit connection and for the called circuit to register connection. For this pattern to be possible a pulse train on the output of PSG7 must coincide with the pulse train on lead PIL8 and this pulse train must not appear on PSL6. The output of PSG7 is connected to pulse gate PCG27 to which lead PIL8 is connected. If a pulse train on the output of PSG7 coincides with that on PIL8, it is transmitted through PCG27 to PL8. PL8 is connected to pulse suppression gate PSG9 in which the pulse train is suppressed if it appears on PSL6 which is connected to PSG9. If the pulse train is transmitted through PSG9 to PL9 the calling circuit to register pulse train can be used for both the other connections. PL9 is connected to pulse lengthening means PLM14, the output potential of which, indicates whether this pattern can be used. PL9 is also connected to PL10 via decoupling means DM3 and decoupling means DM4.

In the second most desirable pattern, a pulse train is found which can be used for all three connections although the pulse train already used for the calling circuit to register connection cannot be used. For this pattern to be possible, a pulse train on the output of PSG7 must be found which coincides with the pulse train on PFL3 which does not coincide with pulse trains on either PSL6 or PSL7. The output of PSG7 is connected to pulse coincidence gate PCG28 which transmits to lead PL11 those pulse trains on the output of PSG7 which coincide with those on PFL3. PL11 indicates the suitable pulse trains for the calling circuit to called circuit connection, and it is connected to pulse suppression gate PSG10 which transmits only those pulse trains not appearing on PSL6 to pulse lead PL12. PL12 indicates the suitable pulse trains for both the calling circuit to called circuit connection, and for the called circuit to register connection and it is connected to pulse suppression gate PSG11 which transmits to pulse lead PL13 only those pulse trains not appearing on PSL7. Signals on pulse lead PL13 indicate those pulse trains which may be used for all three connections and those connected to pulse lengthening means PLM15 the output of which indicates whether this pulse pattern can be used. PL13 is also connected to suppression gate SG1 which transmits the pulse trains on PL13 to PL10, via DM3 and DM4 unless the output of PLM14 applied to SG1 indicates that the first pattern can be used.

If neither of the above patterns can be used but pulse trains appear on PL12 indicating that a common pulse train can be used for the calling circuit to called circuit connection, and the called circuit to register connection, then the pattern adopted is that the register to calling circuit continues to use the pulse train it is already using, and another pulse train is used for the other two connections. That this pattern can be used is indicated by the presence of pulse trains on pulse lead PL12 which is connected to pulse lengthening means PLM16, the output of which indicates whether this pattern can be used. PL12 is also connected to suppression gate SG2 which transmits the pulse trains on PL12 to PL10 via SG1, DM3, and DM4 unless the output of either PLM14 applied to SG1 or PLM15 applied to SG2 indicate that either of the first two patterns can be used.

If none of these three patterns can be used, but a pulse train appears on PL8 indicating that the calling circuit to register pulse train can be used in the connection to a free called circuit, then the pattern adopted is that the register to calling circuit connection continues to use the pulse train it is already using and this pulse train is used also for the calling circuit to called circuit connection, while another pulse train is used for the called circuit to register connection. That this pattern can be used is indicated by the presence of a pulse train on lead PL8 which is connected to pulse lengthening means PLM17, the output of which indicates whether this pattern can be used. PL8 is also connected to suppression gate SG3 which transmits the pulse train on PL8 to PL10 via SG2, SG1, DM3 and DM4 unless the output of PLM14 applied to SG1, PLM15 applied to SG2 or PLM16 applied to SG3 indicates that any of the first three patterns can be used.

If none of these four patterns can be used, but pulse trains appear on pulse lead PL11 indicating that there is a free pulse train which can be used for the calling circuit to called circuit connection, and if this pulse train is also free on the calling side of the register, then the pattern adopted is that the calling circuit to register and calling circuit to called circuit connections use the same pulse train which is different from that already used by the calling circuit to register connection, and different again from the pulse train to be used by the called circuit to register connection. Pulse lead PL11 is connected to pulse suppression gate PSG12 which transmits to pulse lead PL14 both those pulse trains on PL11 not coinciding with those on PSL7. Thus on PL14 appear those pulse trains which can be used for connections between the calling circuit and the register, and the calling circuit and a called circuit. Pulse lead PL14 is connected to suppression gate SG4 which transmits the pulse trains on PL14 through to PL10 via SG3, SG2, SG1, DM3, and DM4 unless the output of PLM14 applied to SG1, PLM15 applied to SG2, PLM16 applied to SG3 or PLM17 applied to SG4 indicates that any of the first four patterns can be used.

The presence of pulses on the output of DM3 indicates that a connection can be made between a calling circuit and a called circuit in different groups. The output of DM3 is connected to a pulse lengthening means PLM18 the output of which is used to indicate that such a connection can be made. On lead PL10 appear those pulse trains which can be used for the calling to called circuit connection, and sometimes depending upon the pattern, the pulse trains which can be used for the calling circuit to register and for the called circuit to register connections.

It is now necessary to find the called groups which are suitable for such a connection. Those groups which include a free called circuit and which have free pulse trains or a free pulse train coinciding with the pulse train or trains appearing on lead PL10 are suitable for such a connection. The lead PL10 is connected via pulse suppression gate PSG13 to gates associated one with each group. The group's free pulse trains are applied to such a gate if there is a free called circuit in the group and if a called circuit in the group can be connected to the register on the called side. Thus the output of PSG13 is connected to PCG24 associated with group GRP1 and to which the output of PSG6 is also connected, such that unless GRP1 is the calling circuit's group the pulse trains on PL7 are applied to PCG24 as are the pulse trains on the output of PSG13. If coincident pulse trains appear on the two inputs to PCG24, it is known that GRP1 is a suitable called group. The output lead PL15 of PCG24 is connected to pulse lengthening means PLM19 whose output indicates whether GRP1 is among the groups, to a circuit of which, connection can be made using the appropriate pattern of pulse trains. There may be more than one such group and a selection of one is made using a multiplex pulse generator MX6 and called group selecting means SEL5 which operate in like manner to MX3 and SEL2. SEL5 selects one suitable group and DC indicates the selected group on a combination of D.C. indicating leads which correspond to the combination of timing devices associated with the called group in the sets of timing devices used to distribute pulses to the intermediate modulator pairs which connect common lead pairs to the register common lead pairs. Thus if GRP1 is the selected group, that fact is indicated on D.C. indicating leads DCIL7 and DCIL8 which are associated with timing devices TD7 and TD8 used in connecting GRII and GT1 to register common lead pairs on the called side.

The combination of D.C. indicating leads associated with a group are connected to a gate associated with the group, signals on the output lead of which indicate whether the associated group is the selected called group. Thus DCIL7 and DCIL8 of group GRP1 are both connected to DCG31 and the D.C. signal on its output lead DCIL16 indicates that GRP1 is the selected group.

Thus if a connection can be made between a calling circuit and a called circuit in different groups, the called group is selected and indicated. If a connection cannot be made between a calling circuit and a called circuit in different groups it may still be possible to make a connection between a called circuit and a calling circuit in the same group. Thus if pulse trains appear on PIL10 but no pulse trains appear on PIL11 then it is known that it is possible to make a connection between a calling circuit and a called circuit in the same group, and that there is no chance of making a connection between a calling circuit and a called circuit in different groups. The fact that no pulses appear on PIL11 means that no suppression signal will be derived in pulse lengthening means PLM12 and no pulse suppression signal will appear on the suppression lead connected to PSG8. Thus the pulse trains on PIL10 will be transmitted through PSG8 to its output lead. Similarly, although the pulse trains appear on PL11 they may be unsuitable for connections between the called circuit and the calling circuit in different groups, and in that case, no pulses will appear on the output of DM3 and the output of PLM18 will indicate that the connection between a calling circuit and a called circuit in different groups cannot be made. This output lead is connected to D.C. suppression gate DSG1 such that if there are no pulses on the output of DM3 the suppression signal from PLM12 is suppressed and is not applied to PSG8, so that pulses on PIL10 are transmitted through PSG8 after PLM12 has operated to let the pulses on PIL10 be transmitted through PSG8. Thus the fact that pulses appear on the output of PSG8 indicates that no connection can be made between circuits in different groups, but that a connection can be made between circuits in the same group. The output of PSG8 is connected to pulse suppression gate PSG14 to which PSL6 is connected, such that on the output of PSG14 appear only those pulses which are suitable for use in the called circuit to register connection. The pulse trains on the output of PSG14 are connected to pulse indicating lead PL10 via decoupling means DM4. The output of PSG14 is also connected to pulse lengthening means PLM20 the D.C. output of which indicates whether the connection is made between circuits in different groups or circuits in the same group. The output of PLM20 is connected to PSG13 and if the connection is to be made between circuits in the same group, pulse trains appearing on PL10 are prevented from being transmitted through PSG13. The output of PLM20 is also connected to gates associated with each group as DCG6 associated with group GRP1 to which the lead which indicates whether the associated group is the calling circuit's group is also connected. Thus DCL4 of group GRP1 is connected to DCG6 and the output of DCG6 indicates whether GRP1 is the group in which a connection is to be made between a calling and a called circuit. The output of DCG6 is connected in parallel with the output of PLM19 to MX6 such that called group selecting means SEL5 is operated to indicate that GRP1 is the group which includes a called circuit. Thus irrespective of whether the calling and called circuits to be connected are in the same groups or in different groups, the called circuit's group is D.C. indicated on the output of SEL5. The called group is thus selected and indicated and it remains to show how the called circuit and the pulse trains to be used are selected. Lead DCIL16 is connected to pulse gate PG27, and if GRP1 is the selected called group, the pulse trains of the free marked circuits in that group, which are present on PFL5 are transmitted to common circuit pulse indicating lead PIL12. PIL12 is connected to circuits selecting means SEL6 which selects a called circuit in the selected group by selecting one of the pulse trains that appear on PIL12. The combination of timing devices associated with the seelcted circuit is indicated over a corresponding combination of D.C. indicating leads, and the indications are transmitted to all groups. If the selected combination corresponds to circuit CT1 in group GRP1, this combination is D.C. indicated on leads DCIL17 and DCIL18. The selected combination is also pulse indicated on lead PL16 by a pulse train coinciding with the selected circuit's pulse train. Lead PL16 is connected to pulse gates associated with each group and only the gate associated with the selected called group allows the applied pulse to pass through. Thus, if GRP1 is the selected group, the indication on DCIL16 opens PCG32 to which it is connected and the pulses appearing on PL16 pass via PCG32 to the timing device TD20 which is then operated to generate the individual pulse train of the selected circuit. As already described the timing device TD20 stores the individual pulse trains of all the circuits in group GRP1 which have been selected, and which are engaged in the connection. Its function is to prevent the selection of a busy circuit by applying the individual pulse trains it stores to pulse suppression gates PSG31 and PSG5 as already described.

Lead DCIL16 on which is indicated that the group GRP1 is the selected called group, is also connected to gate PG28 which, when GRP1 is the selected group, is opened by the signal on DCIL16 to allow the transmission through the gate from lead PL7 to common pulse indicating lead PIL13 of the pulse trains not in use in the modulators of the selected called group. At least one pulse train on lead PIL13 is coincident with at least one pulse train on lead PL10 and it is the pulse trains that appear on both of these leads that are suitable either for the calling to called circuit connection when the calling or called circuits are in different groups, or for the called circuit to register connection if the calling and called circuits are in the same group. PIL13 and PL10 are connected to gate PCG33 and only the coincident pulse trains applied on both these leads are transmitted over PL17. Unless the calling and called circuits are in the same group, which fact is indicated on the output of pulse lengthening means PLM20, the pulse trains on PL17 are those which are suitable for the calling circuit to called circuit connection and PL17 is connected via pulse suppression gate PSG15 to calling to called circuit pulse train selecting means SEL7. A pulse train is selected and pulses indicated on lead PIL14 unless the output of PLM20 prevents the transmission of the pulse applied on PL17 through PSG15. This pulse train on lead PIL14 is used for the calling circuit to called circuit connection if these two circuits are in different groups.

When the calling and called circuits are in different groups, then if any pulse train on PL10 is free in the called register modulator pairs, then all the pulse trains on PL10 will be free there. This was a function of the tree which ascertained which pattern of pulse trains was suitable. If the pulse trains on lead PL10 and therefore on lead PL17 are not in use in the called register modulator pairs, the same pulse train may be used for the called circuit to register connection as for the calling circuit to called circuit connection and no further pulse selection is required. If, however, the pulse trains on lead PL10 are not free in the called circuit modulator pairs, it is necessary to select a pulse train that is free in the called register modulator pairs and in the modulator pairs of the selected called group.

Lead PL10 is connected to pulse suppression gate PSG16 which allows to pass through only those pulse trains which do not appear on PSL6. If pulse trains are transmitted through PSG16 they are lengthened in pulse lengthening means PLM21 the output of which on DCL5 is used to indicated whether the pulse train selected by SEL7 is suitable for the called circuit to register connection. DCL5 is connected to suppression gate DPSG1 via D.C. suppression gate DSG2. DPSG1 is opened only to the pulse trains on lead PIL13 which do not coincide with those on PSL6 and these appear on the output of DPSG1 only if no suppression signal appears from the output of DSG2. If the calling and called circuits are in different groups and if the pulse train selected by SEL7 is suitable for the called circuit to register connection, such a suppression signal will appear on the output of DSG2 derived from PLM21. If the calling and called circuits are in the same group, the output of PLM20 connected to DSG2 will suppress any such suppressing signal, and the pulse trains appearing on PIL13 which do not coincide with the pulse trains appearing on PSL6 are transmitted through DPSG1 to SEL8. The pulse train selected by SEL8 appears on pulse indicating lead PIL15 on which appears the pulse train to be used in the called circuit to register connection. PIL14 is connected to PIL15 via pulse gate PG29 which transmits the pulses on PIL14 to PIL15 when opened by the signal on the output of DSG2 which indicates that the calling to called circuit connection pulse train is to be used for the called circuit to register connection.

Lead PIL14 is also connected to suppression gate PSG17 so that only if the pulse train selected by SEL7 is not already in use by the calling register modulator pairs is the selected calling circuit to called circuit connection pulse train on PIL14 transmitted through PSG17, to which PSL7 is connected, to PL18. The pulse train is only so transmitted when the pattern to be used is such that the calling circuit to register connection pulse train is to be changed from that already in use.

The output of PLM20 is also connected to pulse suppression gate PSG7 such that if the connection is to be made between a calling circuit and a called circuit in the same group, any pulse trains on PIL11 which may appear already or may subsequently appear are not transmitted through PSG2 to PLM12 or to the tree. This prevents the appearance of a newly released pulse train on PIL11 from interfering with the setting up operations for a connection between two circuits in the same group.

Lead PIL15 is connected to gates associated with each timing device in the set of timing devices used to distribute pulses to the called modulator pairs to the register and the combination of these that is D.C. indicated from the set of pulse lengthening means which include PLM9 and PLM10, transmit the selected pulse train to the associated timing devices which become operated to generate that pulse train. Thus if REG1 is the relevant register, the D.C. indications on DCIL11 and DCIL12 open gates PG11 and PG12 which transmit the selected called circuit to register pulse train on PIL15 to timing device TD11 and TD12 (Fig. 6) causing that pulse train to become effective in RTM2 and RRM2.

Lead PIL15 is also connected to gates associated with each timing device in the set of timing devices used to distribute pulse trains to the intermediate modulators connecting group common lead pairs to the register common lead pair, and the combination of these which is D.C. indicated by SEL5 transmits the selected pulse train on PIL15 to the associated timing devices which become operated to generate that pulse train which is made effective in the modulator pairs connecting the selected group common lead pair to the register called common lead pair. Thus if GRP1 is the selected group, the D.C. indications on DCIL7 and DCIL8 open gates PG7 and PG8 which transmit the selected pulse train on lead PIL15 to the timing devices TD7 and TD8 causing that pulse train to be effective in M7 and M8.

PIL14 and PIL15 are both connected via decoupling means DM5 to lead PL19 on which appears the pulse train or trains to be used in both the called circuit connections, to the register and to the calling circuit. PL19 is connected to gates associated with each group and the one which is DC indicated over a lead such as DCIL16 transmits the pulse trains to gates associated with each timing device in the set of timing devices used to distribute pulse trains to the modulator pairs on the called circuit's group. The combination of these which is D.C. indicated from SEL6 transmits the selected pulse train or trains to the associated timing devices which become operated to generate the selected pulse train or trains which are thus made effective in the modulator pairs of the selected called circuit. Thus if CT1 in group GRP1 is the selected called circuit, the DC indication on DCIL16 opens gate PCG19 allows the pulses on PL19 to reach PL20, and the DC indication on DCIL17 and DCIL18 opens pulse gates PG17 and PG18 to allow the pulses on PL20 to reach timing devices TD1 and TD2 so causing the selected pulse train or trains to be effective in TM1 and TM2.

transmits the pulse trains to gates associated with each group and the one for the group which includes the calling circuit is DC indicated over a lead such as DCL4, and the group gate then transmits the pulse train on PIL14 to gates associated with each timing device in the set of timing devices used to distribute pulse trains to the modulators of the group. The combination of these which is DC indicated by the set of pulse lengthening means such as PLM4 and PLM7 transmit the selected pulse train to the associated timing devices which become operated to generate the selected pulse train which thus becomes effective in the modulator pair of the calling circuit. Thus if circuit CT1 in group GRP1 is the calling circuit, the DC indication on DCL4 opens gate PCG21 which transmits the pulses on lead PIL14 to PL21 and the DC indication from PLM4 and PLM7 opens gates PG30 and PG31 which transmit the selected pulse train to timing devices TD1 and TD2 and the selected pulse train thus becomes effective in TM1 and RM1. Sometimes this operation is redundant as the pulse train on lead PIL14 is the same as that already used in the calling circuit to register connection, but in general either the calling circuit to called circuit connection, or the calling circuit to register connection, will require a different pulse train to be made effective.

If the pulse train used in the calling circuit to register connection is required to be changed, the new pulse train appears on PL18. PL18 is connected to gates associated with each timing device in the set of timing devices used to distribute pulses to the calling modulator pairs of the registers and a combination of these, which is DC indicated in the set of pulse lengthening means such as PLM9 and PLM10 transmits the pulse train on PL18 to the associated timing devices which become operated to generate that pulse train. Thus if REG1 is the relevant register, the DC indications on DCIL11 and DCIL12 open gates PG32 and PG33 which transmit the selected pulse train on lead PL18 to timing devices TD9 and TD10 thus causing that pulse train to be made effective in RTM2 and RRM2. Lead PL18 is also connected to pulse gates associated with each timing device in the set of timing devices used to distribute pulse trains to the intermediate modulators connecting the common lead pairs to the register common lead pair on the calling side, as a combination of these which is DC indicated by the outputs from the set of pulse lengthening means which include PLM5 and PLM6, is opened to transmit the pulses on lead PL18 to the associated timing devices which become operated to generate the pulse train, which thus becomes effective in the modulator pair connecting the common lead pair of the calling circuit's group to the register common lead pair on the calling side. Thus if GRP1 is the calling circuit's group, the DC indications from PLM5 and PLM6 open gates PG34 and PG35 which transmit the pulses on pulse lead PL18 to TD5 and TD6 thus causing the selected pulse train to be made effective in M3 and M4.

For a connection between two circuits in different groups, the pulse train selected by SEL7 must also be made effective in the modulator pair connecting the common lead pairs of the two circuit's groups. For a connection between two circuits in the same group, a free audio link in that group must be selected and the pulse train selected by SEL8 must be made effective in the modulator pair at one end of that audio link and the pulse train already used for the calling circuit to register connection must be made effective in the modulator pair at the other end of the audio link. Assuming first of all that the calling circuit and the called circuit are in different groups. The calling circuit's group is D.C. indicated by a lead as, for example DCL4 associated with group GRP1 and the called circuit's group is indicated by lead DCIL16 of group GRP1. As has already been described, the timing devices used to distribute pulse trains to a modulator pair connecting the calling circuit's group common lead pair to the called circuit's group common lead pair may be associated with the calling circuit's group or they may be associated with the called circuit's group. Thus for example, for a connection between a circuit in GRP1 and a circuit in GRP2, the modulator pair connecting their common leads is associated with a timing device in a set of timing devices associated with GRP1, while for a connection between a circuit in GRP1 and a circuit in GRP3, the modulator pair connecting them is associated with timing devices in a set of timing devices associated with GRP3. GRP2 is associated with a combination of timing devices in group GRP1's set of timing devices, while GRP1 is associated with a combination of timing devices in GRP3's set of timing devices. It may be arranged that the combination of timing devices associated with a group is the same in all the sets of timing devices associated with groups which have associated with them, the modulator pairs for the purposes of pulse distribution which connect their common lead pairs to said group's common lead pair. Thus for a connection between a circuit in a first group and a circuit in a second group, it is necessary to know whether to indicate the combination of timing devices of the first group to the second group's set of timing devices, or whether to indicate the combination of timing devices of the second group to the set of timing devices of the first group. If the first group's set of timing devices is to be used, the calling circuit to called circuit pulse train selected by SEL7 is applied to all the timing devices in said set and the combination of these, which is associated with the second group and which is D.C. indicated to said first group's set of timing devices then becomes operated to generate the calling to called circuit pulse train. If the second group's set of timing devices is to be used, the pulse train is applied to all the timing devices in said set and the combination of these which is associated with the first group and which is D.C. indicated to said set, becomes operated to generate the selected pulse train. To ascertain which of the two groups is to be D.C. indicated to the other and which group is to be D.C. indicated to, each group is associated with a pulse train in a set of time spaced pulse trains. This will now be made clearer with reference to the diagram.

If GRP1 is the calling circuit's group, this is D.C. indicated on DCL4. If GRP1 is the called circuit's group, this is indicated on DCIL16. DCL4 and DCIL16 are both connected via de-coupling means DM6 to pulse coincidence gate PCG34. The pulse train associated with group GRP1 is applied to PCG34 over pulse lead K3. If GRP1 includes either the calling or the called circuit the signal on the output of DM6 opens gate PCG34 so that the pulse train applied on K3 is transmitted to PIL16. Thus on pulse indicating lead PIL16 appear the pulse trains of the two groups, circuits of which are to be connected. PIL16 is connected to pulse coincidence gates associated one with each group, for example, PCG35 associated with GRP1. To such a pulse coincidence gate is also connected the output of DM6, the signal on which indicates whether the group includes one of the circuits to be connected. Through such a pulse coincidence gate is also connected a pulse lead on which appears the pulse trains of those groups to the set of timing devices of which the group's combination must be indicated. Thus PIL16 is connected to PCG35 of group GRP1 to which the output of DM6 is connected, as is pulse lead K4 on which appears the pulse trains of those groups, whose sets of timing devices are used to distribute pulses to the modulator pairs connecting their common lead pairs to the common lead pair of group GRP1. Thus among those pulse trains appearing on K4 will be the pulse train of group GRP3. A pulse train on PIL16 is only transmitted through PCG35 if GRP1 includes either the calling or the called circuit, which is indicated on the output of DM6, and if the pulse train on PIL16 other than GRP1's individual pulse train, coincides with a pulse train on K4, thus indicating that GRP1's combination must be indicated to a set of timing devices of another group. The output of PCG35 is connected to pulse lengthening means PLM22 the D.C. output of which indicates whether the combination associated with group GRP1 is to be indicated. The output of PLM22 is connected to a combination of two D.C. indicating leads DCIL13 and DCIL14 in a set of D.C. indicating leads used to indicate the combination of timing devices associated with one of the two groups, to the set of timing devices associated with the other of the two groups. Each lead in the set of D.C. indicating leads is connected to gates associated with each group. Thus DCIL13 is connected to gate DCG3 associated with timing device TD13 of group GRP1, and similarly DCIL15 is connected to DCG5 associated with TD15. If group GRP2 is to be indicated to another group, DCIL13 and DCIL15 comprise the combination of D.C. indicating leads used. Thus for a connection between a circuit in group GRP1 and a circuit in group GRP2, D.C. indicating leads DCIL13 and DCIL15 indicate the combination of timing devices in the set of timing devices of group GRP1 to be used. If, however, the connection is between a circuit in group GRP1 and a circuit in group GRP3 the output of PLM22 connected to D.C. indicating leads DCIL13 and DCIL14 indicate the combination of timing devices in the set of timing devices associated with group GRP3 to be used.

Thus if the connection is to be established between two circuits in different groups, one of the groups D.C. indicates the combination of timing devices to be used in the set of timing devices associated with the other group. The pulse train selected by SEL7 is applied to all the timing devices in the set of timing devices which is D.C. indicated. Thus PIL14 is connected with gates, one for each group, which transmit the pulse train applied on PIL14 if the associated group includes either the calling circuit or the called circuit to be connected. Thus PIL14 is connected to PG36 associated with group GRP1 to which the output of DM6 is connected, such that if GRP1 includes either the calling or the called circuit, the signal on the output of DM6 opens PG36, which transmits the applied pulse train to the input of pulse suppression gate PSG18. The signal on the output of PLM22 prevents the transmission of the pulse train through PSG18 to which said output is connected if GRP1 is the group whose combination is to be D.C. indicated. If however, GRP1 is the group whose set of timing devices is to be D.C. indicated to, the pulse train on PIL14 is transmitted via PG36 and PSG18 to pulse indicating lead PIL17. PIL17 is connected to gates, as for example DCG3 and DCG5 associated with timing devices in the set of timing devices which includes TD13, TD14 and TD15. The combination of these gates which is opened by the signals on the set of D.C. indicating leads, which includes DCIL13, DCIL14 and DCIL15, are opened to transmit the applied pulse train on PIL17 to their associated timing devices which become operated to generate the pulse train which is thus made effective in the modulator pair connecting the common lead pair of the two groups. Thus if the connection is between a circuit in group GRP1 and a circuit in group GRP2, the signals on DCIL13 and DCIL15 open gates DCG3 and DCG5 which transmit the calling circuit to called circuit pulse train applied on PIL17 to timing devices TD13 and TD15, which become operated to generate that pulse train which is thus made effective in modulator pairs M1 and M2, which connect the group common lead pairs of group GRP1 and group GRP2. Similarly, the selected calling circuit to called circuit pulse train may be made effective in the modulator pair connecting any other pair of groups. Thus all the selected pulse trains are made effective in the appropriate pairs of modulators for a connection between two circuits, in different groups. It remains to be shown how the selected pulse trains are made effective in the modulator pairs of a selected audio link used for a connection between circuits in the same group.

To complete a connection between two circuits in the same group it is necessary to select a free audio link in that group. Each audio link has a modulator pair at each end, and each modulator pair is associated with a combination of timing devices in the set of timing devices which is used to distribute pulse trains to the audio link modulator pairs, and to the modulator pairs which connect the common lead pair of the associated group with the common lead pairs of other groups. To make a connection between two circuits using an audio link, it is necessary to make the calling circuit to register pulse train effective in the modulator pair at one end of the audio link, and the called circuit to register pulse train effective in the modulator pair at the other end of the audio link. To achieve this, the calling circuit to register pulse train must be generated by the timing device associated with one of the two modulator pairs, while the called circuit to register pulse train must be generated by the timing devices associated with the modulator pair at the other end of the audio link. Using the techniques already described herein, this is done by associating each timing device in the sets of timing devices used to distribute pulse trains to the audio link modulator pairs with two gates.

In the group which includes the calling and the called circuit, the calling circuit o regser circuit, the calling circuit to register pulse train is applied to one gate associated with each of the timing devices of the set of timing devices of that group. The selected called circuit to register pulse train is applied to the other gates associated with said timing device. It is necessary to select an audio link which is free and to indicate it by signals which will open gates to which the calling circuit to register pulse train is applied which are associated with the combination of timing devices associated with a modulator pair at one end of the selected audio link, and also by signals which open the gates to which the selected called circuit to register pulse train is applied and which are associated with the timing devices used to distribute pulse trains to the modulator pair at the other end of the audio link. It is thus convenient to indicate the selected audio link by two combinations of indicating leads, one in each of two sets of indicating leads. The combination in one set is used to indicate the timing device in which the calling circuit to register pulse train must be made effective and the combination in the other set is used to indicate the combination of timing devices in which the called circuit to register pulse train must be made effective.

It may be arranged that the pair of combinations associated with an audio link in one group corresponds exactly to the pairs of combinations associated with audio links in other groups. Common D.C. indicating leads and common audio link selecting means may then be used. Thus the two sets of indicating leads on the output of audio link selecting means SEL9 are used to indicate the pairs of combinations of timing devices of the selected audio link to all groups. This will be made clearer in a later description of the operation of audio link selecting means SEL9 and its associated units. Each pair of combinations of timing devices, pairs of such combinations being associated in different groups, is associated with a time spaced pulse train in a set of time spaced pulse trains. When the selection of a free audio link has to be made, the pulse trains which are associated with the pair of combinations of timing devices which are associated with free audio links in the group which includes the calling and the called circuits are applied to audio link selecting means SEL9. Each audio link has an indicating lead, the potential of which indicates whether the audio link is busy. The indicating lead of each audio link is connected to a co-incidence circuit individual to it, which indicates whether the associated group includes either the calling or the called circuit. Thus ALB1 of audio link AL1 in group GRP1 is connected to co-incidence circuit DCG7 to which the output of DM6 is also connected. The output of DCG7 is connected to an indicating lead which is common to all the audio links in different groups which are associated with corresponding pairs of combinations of timing devices in the different sets of timing devices. All the common indicating leads of which there is one for each pair of combinations, are connected to multiplex pulse generator MX7 on the output lead of which will appear those pulse trains of pairs of combinations of the free audio links of both the calling circuit's group and the called circuit's group. The output of MX7 is connected to gate PG37 through which the output of PLM20 is connected, such that if the signal on the output of PLM20 indicates that a connection must be made between circuits in the same group, the pulse trains on the output of MX7 are transmitted through PG37 and are applied to audio link selecting means SEL9. When the signal on the output of PLM20 causes the pulse trains on the output of MX7 to be transmitted through PG37, the only pulse trains on the output of MX7 are those of the pairs of combinations associated with free audio links in the group which includes both the calling and the called circuits. SEL9 is operated by a pulse of one of the applied pulse trains, and thus selects one of the free audio links in the group which includes the calling and the called circuits. The D.C. indications on the output of SEL9 are applied to all groups' sets of timing devices used to distribute pulse trains to the audio link modulator pairs. Only in the one group however, are applied the pulse trains to be generated by the timing devices indicated. Thus if GRP1 is the group which includes the calling circuit the calling circuit to register pulse train appears on lead PIL9 and not on the corresponding leads of other groups. PIL9 is connected to gates, one for each timing device and the combination of these which is indicated from SEL9 by the signals on the set of indicating leads used to indicate the combination of timing devices which are to generate the calling circuit to register pulse train is opened to transmit the pulses appearing on PIL9 to their associated timing devices, thus causing the called circuit to register pulse train to become effective in the modulator pair at one end of the selected audio link. Similarly if group GRP1 includes the selected called circuit, the called circuit to register pulse trains appears on PL20 and not on the corresponding leads of other groups. PL20 is connected to gates, one for each timing device in the set of timing devices used to distribute pulse trains to the audio link modulated pairs and the combination of these which is D.C. indicated by the output of SEL9 which indicates the combination of timing devices. The selected called circuit to register pulse train is to be made effective and said gates opened to transmit said pulse train to their associated timing devices, thus causing that pulse train to be made effective in the modulator pair at the other end of the selected audio link. Thus if AL1 is the selected audio link, the indicating potential on DCIL20 and DCIL21 which are two of the indicating leads in the set of indicating leads used to indicate the combinations of timing devices in which the calling circuit to register pulse train must be made effective, opens pulse gates PCG13 and PCG14 to which PIL9 is connected causing the pulse train on PIL9 to be generated by TD13 and TD14, thus causing that pulse train to be effective in modulator pairs RM4 and TM4 at one end of AL1. Similarly the D.C. potential of DCIL22 and DCIL23 which are two indicating leads in the set of indicating leads used to indicate the combination of timing devices which are to generate the called circuit to register pulse train, opens pulse gates PCG36 and PCG37 to which PL20 is connected, thus causing the pulse train on PL20 to be transmitted to TD14 and TD15 which are caused to generate the applied pulse train, thus making it effective in RM5 and TM 5 which comprise the modulator pair at the other end of AL1. Thus for a connection between two circuits in the same group, the appropriate pulse trains will be made effective in the modulator pairs of a selected audio link. The selected audio link will subsequently indicate its busy condition.

Thus irrespective of the type of connection, all the selected pairs are modulated.

If the pulse train used in the calling circuit to register connection is changed, it is desirable to delete the original pulse train from the appropriate timing device. This is achieved by causing the presence of a pulse train on lead PL18 to operate a pulse trigger PT1 which stays operated for a predetermined time after a pulse is received. When PT1 is operated, its output causes the pulse train on PIL8 to be transmitted through pulse gate PG38 to pulse lead PL4, thus preventing the transmission of a coincident pulse train through PSG3, so removing the maintaining pulse on PHL2. This will cause the disappearance of the original pulse train from all the timing devices associated with the calling circuit to register connection, since the maintenance of the storage of the pulse train for this connection is controlled by the register, and the register can cause it to be maintained in other timing devices only as long as it is stored in its own associated timing device. Once PT1 has been operated in the setting up of any one connection, it must not be operated again during the setting up of the same connection because if it does, the new pulse train may also be deleted and this would break down the calling circuit to register connection. A second operation of PT1 is prevented by causing the first operation of PT1 to operate another trigger T1 which when operated, prevents further pulses on pulse lead PL18 from operating PT1.

T1 is not released until all the selecting means used in setting up the called circuit connections are released.

The presence of a hold signal on the transmit hold lead such as H5 on the called side of the register REG1 will cause the pulse train effective in its called transmit modulator to appear on RCDT1. This pulse train will be transmitted through the modulator connecting RCDT1 to the common receive lead of the selected group and thence through the receive modulator of the selected called circuit where after a few pulses, a hold signal will appear on the receive hold lead, such as H2, and this will cause the pulse train of the selected called circuit to be generated by the multiplex, such as MX4. If the selected called circuit is in group GRP1 the pulse train characterising said circuit will appear on lead PL2. PL2 is connected to a gate PG39 which is opened by the D.C. indication on DCIL16 to allow the pulse train on PL2 to be transmitted to common pulse indicating lead PIL8. These pulses may be compared in pulse coincidence gate PCG15 with those appearing on pulse lead PL16, which is pulse indicating the selected called circuit. As soon as the pulse train on PL16 coincides with one on PIL8, it is known that all the selecting and setting up operations have been completed and that there is at least pulse transmission to the called circuit from the register. The output of PCG15 is used to release the selecting means SEL5, SEL6, SEL7, SEL8 and SEL9 and to reset T1 over pulse lead PL22. Once these have been released a further setting up process can be carried out. The marker is also released at this time and the register is disconnected from the marker. The identifying signal from the registed on leads such as DCL3 is removed and the selecting and setting up apparatus is free to be used by another register.

The presence of a called circuit to register connection pulse train on RCDT1, which is connected to pulse maintaining lead PHL4, which is connected to the timing devices used to distribute pulses to the register modulator pairs on the called side and to the intermediate modulator pairs connecting the group common lead pairs to the register called common lead pair, is used to maintain the storage of the required pulse trains in the appropriate timing device. Thus PHL4 is connected to pulse coincidence gates PCG7, PCG8, PCG11 and PCG12 associated with TD7, TD8, TD11 and TD12, and if a connection exists between REG1 and a called circuit in group GRP1 the pulse train used for said connection is stored in these four timing devices until the hold signal on H5 is removed, so causing the pulse train to disappear from PHL4.

In a connection between a called circuit in GRP1 and REG1, the hold signal on H5 also causes the pulse train to appear on leads GR11 and GR1. The presence of the pulse train on GR11 which is connected to pulse suppression gates PSG1 and PSG2 prevents the transmission of the pulse train through them and the presence of the pulse train on GR1 which is connected to PHL3 is used to maintain the storage of the pulse train in the timing devices used to distribute pulse trains to the modulator pair of the called circuit. Thus the called circuit to register connection is held from the register and is only released when the register releases.

The calling circuit to called circuit connection may be held as follows. The pulse trains to be made effective in the modulator pair of the called circuit appear on the pulse indicating lead PL19 and these pulse trains on PL19 are transmitted through a gate individual to the selected called circuit's group. Thus if group GRP1 includes the selected called circuit, pulses on PL19 will be transmitted to PL20. This lead is connected to timing devices TD22 in which the pulse trains being used by called circuits in group GRP1 are stored. These pulse trains appear on the output lead PHL5 of TD22. PHL5 is connected via suitable decoupling means to pulse maintain lead PHL3 connected to the timing device used to distribute pulses to the modulator pairs of the circuits in the associated group. PHL5 is also connected via suitable de-coupling means to pulse maintain lead PHL6 which is connected to the timing devices used to distribute pulse trains to the audio link modulator pairs of group GRP1 and to some of the modulator pairs used to connect the group common lead pair of GRP1 to the group common lead pairs of other groups. Thus so long as a pulse train is stored in TD22, that pulse train is made effective in the modulator pairs, the associated timing devices of which are associated with group GRP1. PHL5 is also connected via PSG19 and DM2 to GT12. Thus unless a coincident pulse train appears on the output of PSG2 which is connected via DM2 to GT12 a pulse train on PHL5 from the output of TD22 is transmitted to GT12. Thus so long as a pulse train is stored in TD22 a coincident pulse train will appear on GT12. GT12 is connected to modulators associated with GRP1's audio links and to modulators which are used to connect GT12 to the group common receive leads of all other groups. A calling circuit to called circuit pulse train appearing on GT12 will coincide with a pulse train effective in one of these modulators. Said pulse train will be transmitted through said modulator and for a connection between a called circuit in group GRP1 and a calling circuit in another group, the pulse train will appear on the group common receive leads as GR12 of the calling circuit's group. Thus in a connection between a calling circuit in group GRP1 and a called circuit in another group, the storage of the calling circuit to called circuit pulse train in the timing devices corresponding to TD22 associated with said other group, will cause the appearance of said pulse train on GR12 associated with group GRP1. For a connection between two circuits in the same group, the appearance of the called circuit to audio link pulse train on the group transmit common lead as GT12 will cause a hold signal to be derived in the audio link used for the connection on a hold lead as H8 and this will cause the pulse train used for the calling circuit to audio link connection to appear on the group receive common lead as GR12. Thus for a connection between two circuits in group GRP1 using audio link AL1, the storage of the called circuit to audio link pulse train in TD22 causes said pulse train to appear on GT12 which is transmitted through RM5 to DA5 and a hold signal is derived in RU5 which appears on hold lead H8 connected to TM4. The calling circuit to audio link pulse train applied to TM4 is transmitted through said hold signal to GR12. Thus for either type of connection the pulse train used by a calling circuit in group GRP1 for the connection to the called circuit will appear on GR12. GR12 is connected via de-coupling means to pulse maintain lead PHL6 which is used to maintain the storage of the appropriate pulse trains in the timing devices of the set of timing devices used to distribute pulses to the audio link modulator pairs of group GRP1 and to some of the modulator pairs connecting the group common lead pair of GRP1 to the group common lead pairs of other groups. GR12 is also connected via PSG1 and DM1 to GR1, such that if a pulse train appears on GR12, a coincident pulse train appears on GR1. GR1 is connected via decoupling means to pulse maintain lead PHL3 which is used to maintain the storage of those pulse trains required to be effective in the modulator pairs of circuits in group GRP1. Thus so long as the pulse train used by a called circuit for the connection to a calling circuit is stored in the timing devices corresponding to TD22 of the called circuit's group, the pulse train or pulse trains used for the connection to a calling circuit remains stored in the timing devices associated with the connection.

The presence of transmit hold signals from the calling circuit causes the pulse trains for both connections to the register and to the called circuit to appear on the common transmit lead of the calling circuit's group.

In group GRP1, the calling circuit to called circuit or calling circuit to audio link pulse train, if not coinciding with the calling circuit to register pulse train is transmitted to GT12 via PSG2 and DM2. If it does coincide with the calling circuit to register pulse train, the pulse train is suppressed by PSG2, but a coincident pulse train is caused to appear on GT12 by connecting GR11 via a limiter LIM1 and DM2 to GT12 so that unmodulated pulses do appear on GT12. For a connection between different groups, the calling circuit to called circuit pulse train is transmitted through the appropriate intermediate modulator and appears on the called circuit common receive lead.

For a connection between circuits in the same group the calling circuit to audio link pulse train transmitted through a modulator to the audio link used, causes the called circuit to audio link pulse train to appear on the group's common receive lead. Thus on GR1 of group GRP1 the pulse train used by the called circuit in a connection to a calling circuit will appear either as the pulse train from the register or as a small amplitude pulse train from the calling side which does not interfere with the reception and demodulation of the called circuit to register pulse train. It is worth noting that the calling circuits modulator pair may receive the pulse train which is to be used for the connection to the called circuit, either from the register or if the calling circuit to register connection uses a different pulse train, it will receive a small amplitude pulse train which is of insufficient amplitude to interfere with the reception and demolulation of the calling circuit to register pulse train.

Thus while the register is connected, the calling circuit to called circuit connection is prepared but not completed, whereas the calling circuit to register and called circuit to register connections are made so that the register can send and receive further information over the calling circuit and send and receive further information over the called circuit.

Eventually the register will finish its operations and will release itself from the connection. When the register releases itself the calling circuit to register pulse train disappears from RCGT1 and PHL2 and causes the calling circuit to register connection to release. If the calling circuit to register connection uses a pulse train different from that used by the calling circuit to called circuit connection, the calling circuit to register pulse train is deleted from the pulse maintaining lead, such as PHL3, and is deleted from the appropriate timing devices. If the pulse trains are the same, the removal of the pulse train from the register will open the pulse suppression gates such as PSG1 and PSG2 which will then transmit the calling to called circuit pulse train. The called circuit to register pulse train disappears from RCDT1 and PHL4 and causes the called circuit to register connection to release. If the pulse train used is the same as is used in the calling circuit to called circuit connection, the removal of the pulse train from the register will open the pulse suppression gates such as PSG1 and PSG2 so completing the calling circuit to called circuit connection. If different pulse trains are used the called circuit to register pulse train is deleted from the timing devices associated with the called circuit in a manner to be described shortly, and in any event the calling circuit to called circuit connection is completed. Lead PHL5 is connected to a gate PSG20 to which group receive common lead GR1 is connected as a suppression lead, so that no pulse train on PHL5 is transmitted through PSG20 if a coincident pulse train appears on GR1. Upon the disappearance of a pulse train on GR1 the pulse train on PHL1 is transmitted through PSG20 when a pulse is applied on pulse lead P1 connected to PSG20. A pulse is applied on P1 of duration greater than the pulse repetition time of a pulse train used in connections, and of repetition time greater than that of a lightly spurious break or dialling impulse break of say 200 milliseconds. The pulse trains transmitted through PSG20 operate a timing device TD23 which may, for example, comprise a mercury delay line circulating system. These pulse trains are stored in TD23 for a time exceeding the period of a lightly spurious break or dialling impulse break, and are then transmitted through a pulse gate PCG23 to which pulses are applied over pulse lead P2, these pulses having a duration greater than the pulse repetition time of a pulse train used in connections, and a repetition time the same as that on P1 but which are timed to occur before the pulses on P1. The transmitted pulse trains from PCG23 are applied to suppression gates in the circulation paths of timing devices TD22 and TD23. Thus the output of PCG23 is connected to pulse suppression gates PSG22 and PSG23. Should a pulse train transmitted through PSG20 re-appear on GR1 before it has been transmitted through PCG23, it is deleted from TD23 by the application of the pulses on GR1 to pulse suppression gate PSG21 which is in the recirculation path of timing device TD23. Thus pulse trains are only deleted from the timing device TD22 if there is a break on GR1 which exceeds 200 milliseconds. The deletion of a pulse train from TD22 causes the removal of the pulse train from pulse maintain lead PHL3 and from pulse hold lead PHL5. This will cause the deletion of the pulse train or pulse trains used for the calling circuit to called circuit connection to be deleted from all the timing devices associated with said connection. The called circuit to register pulse train is similarly deleted from the called circuit timing devices when the register releases, if it does not coincide with the pulse train used for the connection to the calling circuit.

Thus the connection may be released at the termination of the call and the pulse train or pulse trains used for it may then be used for other connections. It will be clear to those skilled in the art that there are many alternative methods of carrying the invention into effect and that its application is not limited to the embodiment herein described. It will also be clear that other functions required in a telephone exchange such as ringing a subscriber's bell, charging for the call, differentiating between classes of service etc. may conveniently be carried out in this exchange system. The individual units comprising the exchange system perform functions which are known to those skilled in the art and may be carried into effect using well known circuit techniques.

The delays of pulse trains on the common transmission leads and on the pulse indicating leads can be compensated for by suitably equalising the delays of the gating pulse trains if necessary, and as described in the specification of U.S. Patent No. 2,727,094 granted to T. H. Flowers, S. D. Harper and L. R. F. Harris, the selecting means which pulse indicate the selected circuit or pulse train or group, can be made to indicate using a pulse train, the pulses of which occur in advance of the pulse train actually applied to the selecting means. Using such techniques, compensation can be made for all the delays through the system.

I claim:

1. Circuit selecting apparatus for selecting one of a number of circuits marked out of a plurality of circuits comprising in combination a number of indicating leads, a number of pulse train generators each generating a set of pulse trains, each lead being connected to a different generator, the number of generators being such that the number of different combinations taken one from each of the sets of pulse trains is at least equal to the plurality of circuits each of which is characterised by a different one of said combinations of pulse trains, pulse train selecting circuits, each lead being connected to a different pulse train selecting circuit and control means associated with each pulse train generator operable to cause the application to the indicating lead connected to the generator of the pulse train comprising the combinations of pulse trains characterising marked circuits.

2. Circuit selecting apparatus comprising a number of circuits, the circuits being arranged in groups, for each group, a first pulse train generator for generating a pulse train representative of each circuit in the group, a further pulse train generator common to all the groups for generating a pulse train characteristic of each group of circuits, a first pulse train selecting circuit connected to said further pulse train generator, a second pulse train selecting apparatus and means for connecting said second pulse train selecting apparatus to any one of the first pulse train generators.

3. Circuit selecting apparatus comprising a number of circuits, the circuits being arranged in groups, for each group a first pulse train generator for generating a pulse train representative of each circuit in the group, a further pulse train generator common to all the groups for generating a pulse train characteristic of each group of circuits, a first pulse train selecting circuit connected to said further pulse train generator, an indicating lead for each first pulse train generator and connected via a pulse gate to a second pulse train selecting circuit common to all said groups, and operative controls from the first selected circuit to each of said pulse gates.

4. Circuit selecting apparatus comprising a number of circuits, the circuits being arranged in groups, for each group, a pulse train generator for generating a pulse train representative of each circuit in the group, direct current signal producing means for producing a signal in the event that the group contains circuits available for selection, a further pulse train generator to which said direct current signal producing means is connected and which is operable to generate a pulse train representative of each circuit containing circuits available for selection, a first pulse train selecting circuit connected to said further pulse train generator, an indicating lead for each first pulse train generator and connected via a pulse gate to a second pulse train selecting circuit common to all said groups, and operative controls from the first selecting circuit to each of said pulse gates.

5. Circuit selecting apparatus according to claim 4 in which said operative controls comprise a plurality of control leads for said first pulse train selecting circuit, said control leads being arranged in combinations each representative of a different group of circuits, a plurality of group indicating gates each connected with a different combination of control leads and each having an output lead connected to that one of said pulse gates in the indicating lead of the group represented by the combination of control leads connected to the indicating gate.

6. Circuit selecting apparatus according to claim 1 and further comprising means for storing the combination of pulse trains representative of a selected circuit and operative controls from said means for inhibiting the appearance of the pulse trains on the indicating leads.

7. Circuit selecting apparatus according to claim 2 and further comprising releasing means for releasing said first and second pulse train selecting circuits after the selection of a circuit to render them available for making a further selection.

8. A communication system comprising a plurality of circuits divided into groups, switching means for establishing a two-way connection between selected circuits, circuit selecting apparatus having, for each group of circuits, a pulse train generator for generating a pulse train representative of each circuit in the group and direct current signal producing means for producing a signal when the group contains circuits available for selection, a further pulse train generator to which said direct current signal producing means is connected and which is operable to generate a pulse train representative of the circuit whose direct current signal producing means produces a signal, a first pulse train selecting circuit connected to said further pulse train generator, an indicating lead for each first pulse train generator and connected via a pulse gate to a second pulse train selecting circuit common to all the groups, a plurality of control leads for said second pulse train selecting circuit, said control leads being arranged in combinations each representative of a different group of circuits, a plurality of group indicating gates each connected to a different combination of control leads and each having an output lead applied to that one of said pulse gates connected to the indicating lead of the group, and means for releasing the first and second selecting circuits at the conclusion of a selection operation.

9. A communication system comprising a first time division multiplex common signal circuit, a first plurality of circuits connected to said common signal circuit, first transmission suppression means in said first common signal circuit, a switching stage connecting said first common signal circuit to a second time division multiplex common signal circuit, a second plurality of circuits connected to said second common signal circuit, and second transmission suppression means in said second common signal circuit.

10. A communication system comprising a first time division multiplex common signal circuit, a first plurality of circuits connected to said common signal circuit, first transmission suppression means in said first common signal circuit, a plurality of further time division multiplex common signal circuits each having a plurality of circuits connected to it, a plurality of switching stages interconnecting the first common signal circuit with a further common signal circuit and each of the latter with each of the other remaining further common signal circuits, control means for establishing communication between a calling and a called circuit by first establishing communication between the calling circuit and the control means by means of a first selected pulse train which is also applied as a suppression to the transmission suppression means in the highway to which said calling circuit is connected.

11. A communication system according to claim 10 in which said called circuit is placed in communication with said control means by means of a second selected pulse train which is applied as a suppression pulse train to the transmission suppression means of the common signal circuit to which the called circuit is connected.

12. A communication system according to claim 10 and further comprising, for said control means, a time division multiplex common signal circuit and a number of switching stages interconnecting said last mentioned common signal circuit and said first and further common signal circuits.

13. A communication system comprising a first time division multiplex common signal circuit, a first plurality of circuits connected to said common signal circuit, first pulse suppression means in said first common signal circuit, a plurality of further time division multiplex common signal circuits each having a plurality of circuits connected to it, a plurality of switching stages interconnecting the first common signal circuit with each further common signal circuit and interconnecting each of the latter with each of the other further common signal circuits, transmission suppression means in each further common signal circuit, control means for establishing communication between a calling and a called circuit and pulse train selecting apparatus for selecting a pulse train to be used in establishing said connection.

14. A communication system according to claim 13 in which said selecting apparatus comprises pulse train comparison means for comparing pulse trains in use on common signal circuits over which said communication is to be established with the pulse trains not in use at the time of comparison and selecting means for selecting one of the pulse trains not in use.

15. A communication system comprising a first time division multiplex common signal circuit, a first plurality of circuits connected to said common signal circuit, first pulse suppression means in said first common signal circuit, a plurality of further time division multiplex common signal circuits each connected to a different plurality of circuits, a plurality of switching stages interconnecting the first common signal circuit with each further common signal circuit and interconnecting each of the latter with each of the other further common signal circuits, transmission suppression means in each further common signal circuit, control means for establishing communication between a calling and a called circuit and pulse train selecting apparatus for selecting a pulse train to be used in establishing said connection and comprising a pulse comparison circuit having a plurality of branches each containing pulse comparison circuits for determining the suitability of pulse trains for use in establishing said connection.

16. A communication system comprising a first time division multiplex common signal circuit, a first plurality of circuits connected to said common signal circuit, first pulse suppression means in said first common signal circuit, a plurality of further time division multiplex common signal circuits each having a plurality of circuits connected to it, a plurality of switching stages interconnecting the first common signal circuit with each further common signal circuit and interconnecting each of the latter with each of the other further common signal circuits, transmission suppression means in each further common signal circuit, control means for establishing communication between a calling and a called circuit and pulse train selecting apparatus for selecting a pulse train to be used in establishing said connection and comprising a pulse comparison circuit having a plurality of branches each containing pulse comparison circuits for determining pulse trains for use in establishing said connection, the output of said pulse comparison circuit being applied to a further pulse comparison circuit in which comparison is made between said output and pulse train not in use on common signal circuits containing circuits with which communication is to be established in order to derive a direct current indication of a common signal circuit containing at least one of said circuits.

17. A communication system comprising a first time division multiplex common signal circuit, a first plurality of circuits connected to said common signal circuit, first pulse suppression means in said first common signal circuit, a plurality of further time division multiplex common signal circuits each having a plurality of circuits connected to it, a plurality of switching stages interconnecting the first common signal circuit with each further common signal circuit and interconnecting each of the latter with each of the other further common signal circuits, transmission suppression means in each further common signal circuit, control means for establishing communication between a calling and a called circuit and pulse train selecting apparatus for selecting a pulse train to be used in establishing said connection, a further common signal circuit, a plurality of registers each connected to a time division multiplex common signal circuit interconnected by switching stages with the first and each further common signal circuit, a marker for receiving information concerning designated circuits and marking said circuits, pulse comparison means for determining pulse trains suitable for establishing communication between a calling circuit and one of the said marked circuits, a pulse suppression gate to which said suitable pulse trains are applied and which operates to suppress transmission of the pulse trains in the event only that communication is capable of being established between the calling circuit and a called circuit connected to a common signal circuit other than that to which the calling circuit is connected to further pulse comparison means which compares said suitable pulse trains with pulse trains not in use on the common signal circuits of called circuits and produces an output which is applied to called circuit common signal circuit selecting means which selects and marks one of said common signal circuits and also marks the switching stage interconnecting said common signal circuit with the common signal circuit to which the calling circuit is connected.

References Cited in the file of this patent

UNITED STATES PATENTS

| | | |
|---|---|---|
| 2,490,833 | Ransom | Dec. 13, 1949 |
| 2,747,021 | Chubb | May 22, 1956 |
| 2,766,327 | Lesti | Oct. 9, 1956 |
| 2,773,934 | Trousdale | Dec. 11, 1956 |